(12) United States Patent
Matsumiya et al.

(10) Patent No.: US 7,929,386 B2
(45) Date of Patent: Apr. 19, 2011

(54) OPTICAL DISC DEVICE

(75) Inventors: Hiroaki Matsumiya, Osaka (JP); Seiji Nishiwaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 12/095,835

(22) PCT Filed: Dec. 6, 2006

(86) PCT No.: PCT/JP2006/324353
§ 371 (c)(1),
(2), (4) Date: Jun. 2, 2008

(87) PCT Pub. No.: WO2007/072683
PCT Pub. Date: Jun. 28, 2007

(65) Prior Publication Data
US 2009/0274022 A1 Nov. 5, 2009

(30) Foreign Application Priority Data
Dec. 22, 2005 (JP) .................................. 2005-369639

(51) Int. Cl.
*G11B 7/00* (2006.01)
(52) U.S. Cl. ................................ 369/44.32; 369/112.15
(58) Field of Classification Search ................. 369/44.32
See application file for complete search history.

(56) References Cited

U.S. PATENT DOCUMENTS

| | | | | |
|---|---|---|---|---|
| 5,523,989 | A | * | 6/1996 | Ishibashi ..................... 369/44.32 |
| 6,125,088 | A | * | 9/2000 | Ogasawara ................. 369/44.32 |
| 6,246,648 | B1 | * | 6/2001 | Kuribayashi ............... 369/44.32 |
| 6,418,095 | B1 | * | 7/2002 | Sano et al. ................. 369/44.32 |
| 7,453,787 | B2 | * | 11/2008 | Ogasawara et al. ...... 369/112.15 |
| 2002/0075774 | A1 | | 6/2002 | Matsuura |
| 2003/0112722 | A1 | * | 6/2003 | Matsuura ................... 369/44.32 |
| 2004/0228236 | A1 | | 11/2004 | Sakai et al. |

FOREIGN PATENT DOCUMENTS

| | | |
|---|---|---|
| JP | 3-245326 | 10/1991 |
| JP | 2000-21014 | 1/2000 |
| JP | 2000-132848 | 5/2000 |
| JP | 2004-342166 | 12/2004 |

* cited by examiner

*Primary Examiner* — Van N Chow
(74) *Attorney, Agent, or Firm* — Hamre, Schumann, Mueller & Larson, P.C.

(57) ABSTRACT

A focus error signal is generated by a first-order diffracted light diffracted by regions 23*b*, 24*b* on a hologram plane 2*a*, and an offset of a tracking error signal is canceled by first-order diffracted light diffracted by regions 21*a*, 22*a*, 23*a*, 24*a* on the hologram plane 2*a*. Consequently, even when there is an error in the substrate thicknesses of optical discs, jitter of a reproduction signal at a focus control point can be reduced by decreasing the distance between the focus control point and the point where the jitter is minimized.

5 Claims, 12 Drawing Sheets

(a)

(b)

(a)

(b)

(a)

(b)

(a)

(b)

(c)

OPTICAL DISC DEVICE

TECHNICAL FIELD

The present invention relates to an optical disc device that optically records information on an optical disc, or optically reproduces information recorded on an optical disc, with use of a laser light source.

BACKGROUND ART

For such a conventional optical disc device, a device as disclosed in Patent document 1 is known for example. Hereinafter, the conventional optical disc device will be described with reference to FIGS. 7-10.

FIG. 7(a) is a side view showing an optical disc device according to a conventional technique. FIG. 7(b) is a plan view showing a light source part of the optical disc device. FIG. 8 is a diagram showing a hologram pattern formed on a hologram used in the optical disc device. FIG. 9 is a diagram showing a photodetective pattern formed on a photodetector used in the optical disc device, and a light distribution of returning light on the photodetector, with respect to a first laser beam emitted from a first emission point of the light source. And FIG. 10 is a diagram showing a photodetective pattern formed on a photodetector used in the optical disc device, and a light distribution of returning light on the photodetector, with respect to a second laser beam emitted from a second emission point of the light source. Each of FIGS. 8-10 shows a hologram plane and a photodetective plane observed from the optical disc side.

As shown in FIGS. 7(a) and 7(b), the optical disc device according to the conventional technique includes a light source 1 such as a semiconductor laser, a collimator lens 4 for converting a light beam emitted from the light source 1 into parallel light, a quarter-wavelength plate 3 for converting linearly-polarized light into circularly-polarized light (or elliptically-polarized light) and converting circularly-polarized light (or elliptically-polarized light) into linearly-polarized light, an objective lens 5 for focusing the parallel light onto the optical disc, a hologram for diffracting the light (returning light) reflected by the optical disc, and a photodetector on which the returning light diffracted by the hologram is focused in a diffused state.

The light source 1 is attached to the photodetective substrate 12, having a first emission point 1a for emitting a first laser beam of a wavelength $\lambda_1$ and a second emission point 1a' for emitting a second laser beam of a wavelength $\lambda_2$ (here, $\lambda_2 > 1$). On the photodetective substrate 12, a reflecting mirror 10 is attached in the vicinity of the light source 1 in order to reflect laser beams emitted from the emission points 1a, 1a', thereby bending the optical paths.

The hologram includes a polarization hologram substrate 13, and a hologram plane 13a formed on the polarization hologram substrate 13. The quarter-wavelength plate 3 is provided on the hologram plane 13a of the polarization hologram substrate 13 and configured to move integrally with the objective lens 5. As shown in FIG. 8, the hologram plane 13a is divided into four regions of a first quadrant, a second quadrant, a third quadrant and a fourth quadrant by two straight lines (x-axis, y-axis) crossing orthogonally at an intersection 100 between an optical axis 7 for the first laser beam and the hologram plane 13a. And furthermore, the respective quadrants are divided into strip-shaped regions along the x-axis: 91B, 91F; 92B, 92F; 93B, 93F; and 94B, 94F (hologram pattern).

The photodetector includes a photodetective substrate 12 and a photodetective plane 12a formed on the photodetective substrate 12. The photodetective plane 12a is located substantially at the focal plane position of the collimator lens 4 (that is, the position of a virtual emission point of the first emission point 1a shown in FIG. 7(b)). As shown in FIGS. 9 and 10, on the photodetective plane 12a, comb-tooth-shaped focus detection cells F1a, F2a, F1b, F2b, F1c, F2c, F1d, F2d, F1e and F2e are arranged along the Y-axis on the plus side of the Y-axis, and trapezoidal tracking detection cells 7T1, 7T2, 7T3, and 7T4 are arranged along the Y-axis on the minus side of the Y-axis (photodetective pattern), where the X-axis and Y-axis denote two straight lines crossing orthogonally at the intersection 90 between the optical axis 7 and the photodetective plane 12a, and parallel to the x-axis and y-axis respectively. These detection cells are arranged symmetrically with respect to the Y-axis. A light beam emitted from the first emission point 1a of the light source 1 travels in parallel to the X-axis in a plane that includes the X-axis and perpendicular to the sheet of drawing, and the light is reflected by the reflecting mirror 10 in the direction of the optical axis 7 (a direction passing the intersection 90 and orthogonal to the sheet of drawing).

As shown in FIGS. 7(a) and 7(b), the first laser beam (wavelength: $\lambda_1$) emitted from the first emission point 1a of the light source 1 is reflected by the reflecting mirror 10, and focused by the collimator lens 4 so as to form a parallel light. This parallel light as linearly-polarized light (S-wave or P-wave) passes through the hologram and is converted into circularly-polarized light by the quarter-wavelength plate 3, then focused by the objective lens 5 so as to form a light spot on a signal plane 6a of a first optical disc 6. The light reflected by the signal plane 6a of the first optical disc 6 passes through the objective lens 5 and is converted into linearly-polarized light (P-wave or S-wave) by the quarter-wavelength plate 3, then enters a hologram plane 13a. The linearly-polarized light entering the hologram plane 13a is diffracted by the hologram plane 13a and split into first-order diffracted light 14 and minus first-order diffracted light 14' with respect to the optical axis 7 serving as the symmetry axis. The respective diffracted light beams form convergent light beams through the collimator lens 4 and enter the photodetective plane 12a on the photodetective substrate 12. The diffraction efficiency of the returning light due to the hologram plane 13a is, for example, about 0% for a zeroth-order light, and about 41% for ±first-order light beams respectively.

The second laser beam (wavelength: $\lambda_2$, where $\lambda_2 > \lambda_1$) emitted from the second emission point 1a' of the light source 1 is reflected by the reflecting mirror 10, focused by the collimator lens 4 so as to form a parallel light. This parallel light as linearly-polarized light (S-wave or P-wave) passes through (is partly diffracted by) the hologram and is converted into elliptically-polarized light by the quarter-wavelength plate 3, which then is focused by the objective lens 5 so as to form a light spot on a signal plane 6a' of a second optical disc 6'. The light reflected by the signal plane 6a' of the second optical disc 6' passes through the objective lens 5 and is converted into linearly-polarized light (P-wave or S-wave) by the quarter-wavelength plate 3, and then enters a hologram plane 13a. The linearly-polarized light entering the hologram plane 13a is diffracted by the hologram plane 13a and split into a first-order diffracted light 15 and a minus first-order diffracted light 15' with respect to the optical axis 7' serving as the symmetry axis. The respective diffracted light beams pass through the collimator lens 4 so as to form convergent light, and enter the photodetective plane 12a on the photodetective substrate 12.

A light beam emitted from the first emission point 1a of the light source 1 and reflected by the signal plane 6a of the first optical disc 6 enters the hologram plane 13a. As shown in FIG. 9, first-order diffracted light beams 81B, 81F (not shown) diffracted by strip-shaped regions 91B, 91F on the first quadrant of the hologram plane 13a are focused on light spots 81BS, 81FS astride the border between detection cells F2a, F1b; minus first-order diffracted light beams 81B', 81F' (not shown) are focused on light spots 81BS', 81FS' formed within the detection cell 7T1. First-order diffracted light beams 82B, 82F (not shown) diffracted by strip-shaped regions 92B, 92F on the second quadrant of the hologram plane 2a are focused on light spots 82BS, 82FS astride the border between detection cells F1b, F2b; minus first-order diffracted light beams 82B', 82F' (not shown) are focused on light spots 82BS', 82FS' formed within the detection cell 7T2. First-order diffracted light beams 83B, 83F (not shown) diffracted by strip-shaped regions 93B, 93F on the third quadrant of the hologram plane 2a are focused on light spots 83BS, 83FS astride the border between detection cells F1d, F2d; minus first-order diffracted light beams 83B', 83F' (not shown) are focused on light spots 83BS', 83FS' formed within the detection cell 7T3. And, first-order diffracted light beams 84B, 84F (not shown) diffracted by strip-shaped regions 94B, 94F on the fourth quadrant of the hologram plane 2a are focused on light spots 84BS, 84FS astride the border between detection cells F2d, F1e; minus first-order diffracted light beams 84B', 84F' (not shown) are focused on light spots 84BS', 84FS' formed within the detection cell 7T4.

Since the first-order diffracted light beams 81B, 82B, 83B and 84B are focused on the back side of the photodetective plane 12a (i.e. on the further side from the hologram plane 13a), the light spots formed on the photodetective plane 12a are similar in form to the light distribution on the hologram plane 13a. Since the minus first-order diffracted light beams 81B', 82B', 83B' and 84B' are focused on the front side of the photodetective plane 12a (i.e. on the side nearer to the hologram plane 2a), the light spots formed on the photodetective plane 12a are similar in form to a light distribution obtained by inverting the light distribution on the hologram plane 13a with respect to a point 100. Since the first-order diffracted light beams 81F, 82F, 83F and 84F are focused on the front side of the photodetective plane 12a, the light spots formed on the photodetective plane 12a are similar in form to a light distribution obtained by inverting the light distribution on the hologram plane 13a with respect to the point 100. Moreover, since the minus first-order diffracted light beams 81F', 82F', 83F' and 84F' are focused on the back side of the photodetective plane 12a, the light spots formed on the photodetective plane 12a are similar in form to the light distribution on the hologram plane 13a.

Similarly, a light beam emitted from the second emission point 1a' of the light source 1 and reflected by the signal plane 6a' of the second optical disc 6' enters the hologram plane 13a. As shown in FIG. 10, first-order diffracted light beams 101B, 101F (not shown) diffracted by strip-shaped regions 91B, 91F on the first quadrant of the hologram plane 13a are focused on light spots 91BS, 91FS astride the border between detection cells F2a, F1b; minus first-order diffracted light beams 101B', 101F' (not shown) are focused on light spots 91BS', 91FS' formed within the detection cell 7T1. First-order diffracted light beams 102B, 102F (not shown) diffracted by strip-shaped regions 92B, 92F on the second quadrant of the hologram plane 13a are focused on light spots 92BS, 92FS astride the border between detection cells F1b, F2b; minus first-order diffracted light beams 102B', 102F' (not shown) are focused on light spots 92BS', 92FS' formed within the detection cell 7T2. First-order diffracted light beams 103B, 103F (not shown) diffracted by strip-shaped regions 93B, 93F on the third quadrant of the hologram plane 2a are focused on light spots 93BS, 93FS astride the border between detection cells F1d, F2d; minus first-order diffracted light beams 103B', 103F' (not shown) are focused on light spots 93BS', 93FS' formed within the detection cell 7T3. And, first-order diffracted light beams 104B, 104F (not shown) diffracted by strip-shaped regions 94B, 94F on the fourth quadrant of the hologram plane 13a are focused on light spots 94BS, 94FS astride the border between detection cells F2d, F1e; and, minus first-order diffracted light beams 104B', 104F' (not shown) are focused on light spots 94BS', 94FS' formed within the detection cell 7T4.

Since the first-order diffracted light beams 101B, 102B, 103B and 104B are focused on the back side of the photodetective plane 9a (i.e. on the further side from the hologram plane 13a), the light spots formed on the photodetective plane 12a are similar in form to the light distribution on the hologram plane 2a. Since the minus first-order diffracted light beams 101B', 102B', 103B' and 104B' are focused on the front side of the photodetective plane 12a (i.e. on the side nearer to the hologram plane 13a), the light spots formed on the photodetective plane 12a are similar in form to a light distribution obtained by inverting the light distribution on the hologram plane 13a with respect to the point 100. Since the first-order diffracted light beams 101F, 102F, 103F and 104F are focused on the front side of the photodetective plane 12a, the light spots formed on the photodetective plane 12a are similar in form to a light distribution obtained by inverting the light distribution on the hologram plane 13a with respect to the point 100. Moreover, since the minus first-order diffracted light beams 101F', 102F', 103F' and 104F' are focused on the back side of the photodetective plane 12a, the light spots formed on the photodetective plane 12a are similar in form to the light distribution on the hologram plane 13a.

Here, the first optical disc 6 is a DVD, and the second optical disc 6' is a CD, for example.

Some of the detection cells are connected electrically, and as a result, the following six signals can be obtained.

F1=(a signal obtained in the detection cell F1a)+(a signal obtained in the detection cell F1b)+(a signal obtained in the detection cell F1c)+(a signal obtained in the detection cell F1d)+(a signal obtained in the detection cell F1e)

F2=(a signal obtained in the detection cell F2a)+(a signal obtained in the detection cell F2b)+(a signal obtained in the detection cell F2c)+(a signal obtained in the detection cell F2d)+(a signal obtained in the detection cell F2e)

T1=(a signal obtained in the detection cell 7T1)
T2=(a signal obtained in the detection cell 7T2)
T3=(a signal obtained in the detection cell 7T3)
T4=(a signal obtained in the detection cell 7T4)

In FIGS. 9 and 10, with the Y-axis indicating the radial direction of the optical disc (disc-radial direction), a focus error signal FE onto the signal plane of the optical disc, a tracking error signal TE onto a track of the optical disc, and a reproduction signal RF for the signal plane of the optical disc are calculated based on the following formulae (1)-(3).

$$FE = F1 - F2 \qquad \text{Formula (1)}$$

$$TE = T1 + T4 - (T2 + T3) \qquad \text{Formula (2)}$$

$$RF = F1 + F2 + T1 + T2 + T3 + T4 \qquad \text{Formula (3)}$$

In FIG. 9, D1 denotes the distance from a virtual emission point 90 of the first laser beam to each of the boundary between the light spots 82FS and 82BS, the boundary between the light spots 83FS and 83BS, the boundary between the light spots 82FS' and 82BS', and the boundary between the light spots 83FS' and 83BS'. (D1+D1') denotes the distance from the virtual emission point 90 of the first laser beam to each of the boundary between the light spots 81FS and 81BS, the boundary between the light spots 84FS and 84BS, the boundary between the light spots 81FS' and 81BS', and the boundary between the light spots 84FS' and 84BS'. Similarly in FIG. 10, D2 denotes the distance from a virtual emission point 90' of the second laser beam to each of the boundary between the light spots 92FS and 92BS, the boundary between the light spots 93FS and 93BS, the boundary between the light spots 92FS' and 92BS', and the boundary between the light spots 93FS' and 93BS'. (D2+D2') denotes the distance from the virtual emission point 90' of the second laser beam to each of the boundary between the light spots 91FS and 91BS, the boundary between the light spots 94FS and 94BS, the boundary between the light spots 91FS' and 91BS', and the boundary between the light spots 94FS' and 94BS'. Since the distance from the point 90 and the point 90' as the virtual emission points of the laser beam are approximately proportional to a diffraction angle, and since the diffraction angle is approximately proportional to a wavelength, the following Formula (4) is established.

$$D2/D1=D2'/D1'=\lambda_2/\lambda_1 \quad \text{Formula (4)}$$

Here, the conventional photodetective pattern has a shape extending in the Y-axis direction, and thus, even if the wavelength varies, the light spots 81FS' and 81BS', and the light spots 91FS' and 91BS' enter the detection cell 7T1; the light spots 82FS' and 82BS', and the light spots 92FS' and 92BS' enter the detection cell 7T2; the light spots 83FS' and 83BS', and the light spots 93FS' and 93BS' enter the detection cell 7T3; and, the light spots 84FS' and 84BS', and the light spots 94FS' and 94BS' enter the detection cell 7T4. With respect to each of the laser beams, a tracking error signal TE can be obtained in the same manner. On the other hand, the light spots 81FS and 81BS, 82FS and 82BS, 83FS and 83BS, 84FS and 84BS, light spots 91FS and 91BS, 92FS and 92BS, 93FS and 93BS, 94FS and 94BS are shaped to extend less in the X-axis direction and arranged substantially along the Y-axis, and thus, even when the wavelength varies, these light spots just shift along the Y-axis. Therefore, from the detection cells F1a, F2a, F1b, F2b, F1c, F2c, F1d, F2d, F1e and F2e, a focus error signal EF can be obtained corresponding to any of the laser beams.

As mentioned above, from the conventional photodetective pattern, desired focus error signal FE, tracking error signal TE, and reproduction signal RF can be obtained respectively with respect to two laser beams.

Patent document 1: JP 2000-132848 A

DISCLOSURE OF INVENTION

Problem to be Solved by the Invention

However, when there is an error in the substrate thicknesses of the first optical disc 6 and the second optical disc 6', a spherical aberration is generated in the light spot formed on the signal plane 6a of the first optical disc 6 and the light spot formed on the signal plane 6a' of the second optical disc 6', and thus the jitter of a reproduction signal at the focus control position (a control position at which the focus error signal FE becomes zero (FE=0)) cannot be decreased.

This problem will be explained below with reference to FIG. 11. FIGS. 11(a) and 11(b) show light convergence due to the objective lens 5 under a focus control. FIG. 11(a) shows a case where there is no error in the substrate thicknesses of the first optical disc 6 and the second optical disc 6', and FIG. 11(b) shows a case where there is a positive error (thicker than a reference value) in the substrate thicknesses of the first optical disc 6 and the second optical disc 6'. FIG. 11(c) is a plot of a longitudinal aberration d (offset amount of an imaging point from the signal planes 6a, 6a') in FIG. 11(b) with respect to the incident height r of light entering the objective lens 5 (see a curve L1; r2 denotes an aperture radius of the objective lens 5). In FIG. 11(c), the converged light in FIG. 11(b) is: d<0 (focused on the front side of the signal planes 6a, 6a') when incident height r=0·r1, and d>0 (focused on the back side of the signal plane 6a, 6a') when incident height r=r1·r2. In the case of focusing in FIG. 11(b), the wavefront aberration of reflected light from the signal planes 6a, 6a' is doubled after passing through the objective lens 5, thereby forming a curve L2. For the curve L2, within a full-aperture region (0≦r≦r2), the average distortion is substantially zero (the average is on the straight line L0 in FIG. 11(c)). In general, a focus control is stabilized at a position where the average of the wavefront of reflected light after passing through the objective lens 5 becomes flat. Therefore, when the focus control is performed with a light beam in a full-aperture region (0≦r≦r2), FE=0 at the position of the signal planes 6a, 6a'.

When there exists a spherical aberration, the focus control position to minimize jitter during a signal reproduction (jitter best point) does not agree with a position to minimize the light spots on the signal planes 6a, 6a' (namely, a position to minimize the wavefront aberration of the converged light). It has been known, according to an experimental result, that when there is a positive error (namely, the spherical aberration becomes minus) in the substrate thickness of the optical disc, the focus control position that minimizes the jitter during a signal reproduction shifts to the side at which the objective lens comes nearer to the signal plane of the optical disc ('near-side'). Therefore, for a light beam within a full-aperture region (0≦r≦r2), the signal planes 6a, 6a' will be under control, and thus the control is not performed at the jitter best point. This will cause a problem in that the jitter of the reproduction signal at the focus control point will not be decreased.

Here, the tracking error signal TE according to the above Formula (2) can be expressed by the following Formula (5) using suitable coefficients a and b, wherein Δ denotes the amount of off-track with respect to the track of the optical disc, and δ denotes the deviation in the disc radial direction (i.e. the y-axis direction) of the objective lens 5 and the polarization hologram substrate 13.

$$TE=a\Delta+b\delta \quad \text{Formula (5)}$$

An offset occurs with the deviation in the disc radial direction of the objective lens 5 and the polarization hologram substrate 13 that move together (this deviation inevitably occurs under tracking control). The reason why the tracking error signal TE is the function of δ is as follows: the light emitted from the first emission point 1a or the second emission point 1a' exhibits uneven intensity, namely, the light is stronger near the optical axis and is weaker as the distance from the optical axis increases. And the intensity distribution of the returning light 80 (see FIG. 8) on the hologram plane 13a becomes asymmetric with respect to the x-axis due to the deviation of the objective lens 5 and the polarization hologram substrate 13 in the disc radial direction.

Generally, the tracking control is performed to make the tracking error signal TE zero (i.e. TE=0). Hence, according to the above Formula (5), an off-track represented by the following Formula (6) will occur.

$$\Delta = -b\delta/a \quad \text{Formula (6)}$$

This may cause track skipping, deterioration in reproduction signals, deterioration in adjacent track signals in recording, and the like.

In order to solve the aforementioned problems in the conventional techniques, the present invention intends to provide an optical disc device that will reduce a distance between a focus control point and a point at which a jitter of a reproduction signal is minimized even if there is an error in the substrate thickness of optical discs so as to decrease the jitter in the reproduction signal at the focus control point, and where an off-track will not occur at the time of tracking control even when there is a deviation along the disc radial direction of the objective lens and of the polarization hologram substrate.

Means for Solving Problem

In order to achieve the above-mentioned object, a first configuration of an optical disc device according to the present invention includes: a light source, an objective lens, an optical splitter, and a photodetector; a light beam emitted from the light source passes through the objective lens so as to be focused on a track on a signal plane of an optical disc, the light beam reflected and diffracted by the track on the signal plane passes through the objective lens so as to enter the optical splitter, and the light beam emitted from the optical splitter is focused on the photodetector. The optical splitter is divided into a region A' where a zeroth-order diffracted light from the optical disc enters alone and the remaining region A, and the photodetector is divided into a detection region B' for detecting a light beam emitted from the region A of the optical splitter and a detection region B for detecting a light beam emitted from the region A of the optical splitter. A focus error signal is generated by a detection signal from the detection region B, and a tracking error signal is generated by a detection signal from the detection region B, or the detection regions B and B. The tracking error signal is corrected by the detection signal from the detection region B'. A focus control is performed based on the focus error signal so that when a substrate thickness of the optical disc has a positive error (thicker than a reference value), the objective lens is located closer to the signal plane of the optical disc, and when a substrate thickness of the optical disc has a negative error (thinner than a reference value), the objective lens is located away from the signal plane of the optical disc.

The first configuration of the optical disc device can provide an optical disc device wherein, even when there is an error in the substrate thickness of optical discs, a distance between a focus control point and a point at which a jitter of a reproduction signal is minimized is decreased to decrease the jitter of the reproduction signal at the focus control point, and furthermore, even when there is a deviation along the disc radial direction of an objective lens and a polarization hologram substrate, an off-track does not occur at the time of tracking control.

In the first configuration of the optical disc device according to the present invention, it is preferable that the optical splitter is divided into four quadrants k (k=1, 2, 3, 4 counterclockwise) by two straight lines (a y-axis parallel to the radial direction of the optical disc and an x-axis orthogonal to the y-axis) crossing an optical axis; each of the quadrants k is divided further into a region Ak' where a zeroth-order diffracted light from the optical disc enters alone and the remaining region Ak; light beams emitted from the regions Ak and Ak' of the optical splitter are detected respectively by detection cells Bk, Bk' on the detection regions B, B' and outputted as detection signals Ck, Ck'; and a tracking error signal TE is generated through the following expressions (Formula 1) to (Formula 3) using α as a constant.

$$TE1 = (C2' + C3') - (C1' + C4') \quad \text{(Formula 1)}$$

$$TE2 = (C2 + C3) - (C1 + C4) \text{ or}$$

$$TE2 = (C2 + C2' + C3 + C3') - (C1 + C1' + C4 + C4') \quad \text{(Formula 2)}$$

$$TE = TE2 - \alpha \times TE1 \quad \text{(Formula 3)}$$

A second configuration of an optical disc device according to the present invention includes: a first light source, a second light sources, an objective lens, an optical splitter, and a photodetector; light beams emitted from the first and second light sources pass through the objective lens so as to be focused respectively on tracks on signal planes of the first and second light sources, the light beams reflected and diffracted by the tracks on the signal planes pass through the objective lens so as to enter the optical splitter; and the light beam emitted from the optical splitter are focused on the photodetector. The optical splitter is divided into a region A' where a zeroth-order diffracted light from the first optical disc enters alone, a region A" outside a region where a zeroth-order diffracted light and a ±first-order diffracted light from the second optical disc overlap with each other, and the remaining region A; and the photodetector is divided into a detection region B' for detecting a light beam emitted from the region A' of the optical splitter, a detection region B" for detecting a light beam emitted from the region A" of the optical splitter, and a detection region B for detecting light emitted from the region A of the optical splitter. A focus error signal for each optical disc is generated by a detection signal from the detection region B; and a tracking error signal is generated for each optical disc by a detection signal from the detection region B, detection regions B and B', or the detection regions B, B' and B". The tracking error signal of the first optical disc is corrected by a detection signal from the detection region B'; and the tracking error signal of the second optical disc is corrected by a detection signal from the detection region B", or the detection regions B' and B". A focus control of the first optical disc is performed based on the focus error signal so that when the substrate thickness of the first optical disc has a positive error (thicker than a reference value), the objective lens is located closer to the signal plane of the first optical disc; and when the substrate thickness of the first optical disc has a negative error (thinner than a reference value), the objective lens is located away from the signal plane of the first optical disc. A focus control of the second optical disc is performed based on the focus error signal so that when the substrate thickness of the second optical disc has a positive (thicker than a reference value) error, the objective lens is located closer to the signal plane of the second optical disc; and when the substrate thickness of the second optical disc has a negative (thinner than a reference value) error, the objective lens is located away from the signal plane of the second optical disc.

The second configuration of the optical disc device can provide an optical disc device that is suitable for two types of optical discs. And, even when there is an error in the substrate thickness of the optical discs, a distance between a focus control point and a point at which a jitter of a reproduction signal is minimized can be decreased to decrease the jitter of the reproduction signal at the focus control point. Furthermore, even when there is a deviation along the disc radial direction of an objective lens and a polarization hologram substrate, an off-track will not occur at the time of tracking control.

In the second configuration of the optical disc device according to the present invention, it is preferable that the optical splitter is divided into four quadrants k (k=1, 2, 3, 4 counterclockwise) by two straight lines (a y-axis parallel to the radial direction of the optical disc and an x-axis orthogonal to the y-axis) crossing an optical axis; each of the quadrants k is divided further into a region Ak' where a zeroth-order diffracted light from the first optical disc enters alone, a region Ak" outside a region where a zeroth-order diffracted light and a ±first-order diffracted light from the second optical disc overlap with each other, and the remaining region Ak; light beams emitted from the regions Ak, Ak' and Ak" of the optical splitter are detected respectively by detection cells Bk, Bk', Bk" on the detection regions B, B', B" and outputted as detection signals Ck, Ck', Ck"; and a tracking error signal TE with respect to the first optical disc is generated through the following expressions (Formula 4) to (Formula 6) using a as a constant.

$$TE1=(C2'+C3')-(C1'+C4') \quad \text{(Formula 4)}$$

$$TE2=(C2+C3)-(C1+C4) \text{ or}$$

$$TE2=(C2+C2'+C3+C3')-(C1+C1'+C3+C3') \text{ or}$$

$$TE2=(C2+C2'+C2''+C3+C3'+C3'')-(C1+C1'+C1''+C4+C4'+C4'') \quad \text{(Formula 5)}$$

$$TE=TE2-\alpha \times TE1 \quad \text{(Formula 6)}$$

In the second configuration of the optical disc device according to the present invention, it is preferable that the optical splitter is divided into four quadrants k (k=1, 2, 3, 4 counterclockwise) by two straight lines (a y-axis parallel to the radial direction of the optical disc and an x-axis orthogonal to the y-axis) crossing an optical axis; each of the quadrants k is divided further into a region Ak' where a zeroth-order diffracted light from the first optical disc enters alone, a region Ak" outside a region where a zeroth-order diffracted light and a ±first-order diffracted light from the second optical disc overlap with each other, and the remaining region Ak; light beams emitted from the regions Ak, Ak' and Ak" of the optical splitter are detected respectively by detection cells Bk, Bk', Bk" on the detection regions B, B', B" and outputted as detection signals Ck, Ck', Ck"; and a tracking error signal TE with respect to the second optical disc is generated through the following expressions (Formula 7) to (Formula 9) using a as a constant.

$$TE1=(C2'+C3')-(C1'+C4) \text{ or}$$

$$TE1=(C2'+C2''+C3'+C3'')-(C1'+C1''+C4'+C4'') \quad \text{(Formula 7)}$$

$$TE2=(C2+C3)-(C1+C4) \text{ or}$$

$$TE2=(C2+C2'+C3+C3')-(C1+C1'+C4+C4') \text{ or}$$

$$TE2=(C2+C2'+C2''+C3+C3'+C3'')-(C1+C1'+C1''+C4+C4'+C4'') \quad \text{(Formula 8)}$$

$$TE=TE2-\alpha \times TE1 \quad \text{(Formula 9)}$$

In the second configuration of the optical disc device according to the present invention, it is preferable that the first and second light sources and the photodetector are mounted on the same substrate. According to this preferable example, it is possible to perform the tracking control stably with a simple configuration with a reduced numbers of components and reduced numbers of portions to be adjusted.

EFFECTS OF THE INVENTION

According to the present invention, even when there is an error in the substrate thicknesses of optical discs, a jitter of a reproduction signal at a focus control point can be decreased. Moreover, even when there is a deviation along the disc radial direction of an objective lens and a polarization hologram substrate, an off-track will not occur at the time of tracking control. As a result, a stable tracking control is available, and the recording-reproduction performance of an optical disc device is improved.

BRIEF DESCRIPTION OF DRAWINGS

FIG. 1(a) is a side view showing an optical disc device according to an embodiment of the present invention. FIG. 1(b) is a plan view showing a light source part of the optical disc device.

FIG. 2 is a diagram showing a hologram pattern formed on a hologram used in an optical disc device according to an embodiment of the present invention.

FIG. 3 is a diagram showing a photodetective pattern formed on a photodetector used in an optical disc device according to an embodiment of the present invention, and a light distribution of returning light on the photodetector, with respect to a first laser beam emitted from a first emission point of the light source.

FIG. 4 is a diagram showing a photodetective pattern formed on a photodetector used in an optical disc device according to an embodiment of the present invention, and a light distribution of returning light on the photodetector, with respect to a second laser beam emitted from a second emission point of the light source.

FIG. 5 is a diagram showing the positions of focal points on the front and back sides of the photodetective plane in the cross-section taken along the optical axis according to an embodiment of the present invention, at the time of focusing on the signal plane of the optical disc.

FIG. 6(a) is a diagram showing one example of an offset amount of a signal with respect to the deviation of the objective lens and the polarization hologram substrate. FIG. 6(b) is a diagram showing another example of an offset amount of a signal with respect to the deviation of the objective lens and the polarization hologram substrate.

FIG. 7(a) is a side view showing an optical disc device according to a conventional technique, and FIG. 7(b) is a plan view showing a light source part of the optical disc device.

FIG. 8 is a diagram showing a hologram pattern formed on a hologram used in an optical disc device according to a conventional technique.

FIG. 9 is a diagram showing a photodetective pattern formed on a photodetector used in an optical disc device according to a conventional technique, and a light distribution of returning light on the photodetector, with respect to a first laser beam emitted from a first emission point of the light source.

FIG. 10 is a diagram showing a photodetective pattern formed on a photodetector used in an optical disc device according to a conventional technique, and a light distribution of returning light on the photodetector, with respect to a second laser beam emitted from a second emission point of the light source.

FIG. 11(a) is a diagram showing convergence of light due to an objective lens in an optical disc device when there is no error in the substrate thicknesses of optical discs. FIG. 11(b) is a diagram showing convergence of light due to an objective lens in the optical disc device when there is a positive error (thicker than a reference value) in the substrate thicknesses of the optical discs. FIG. 11(c) is a plot of a longitudinal aberration (offset amount of an imaging point from a signal plane) in FIG. 11(b) with respect to incident height of light entering an objective lens.

FIG. 12(b) is a diagram showing convergence of light due to an objective lens in the optical disc device when there is a negative error (thinner than a reference value) in the substrate thicknesses of the optical discs. FIG. 12(c) is a plot of a longitudinal aberration (offset amount of an imaging point from a signal plane) in FIG. 12(b) with respect to an incident height of light entering an objective lens.

DESCRIPTION OF THE INVENTION

Hereinafter, the present invention will be described more specifically by way of embodiments.

Figure 1:
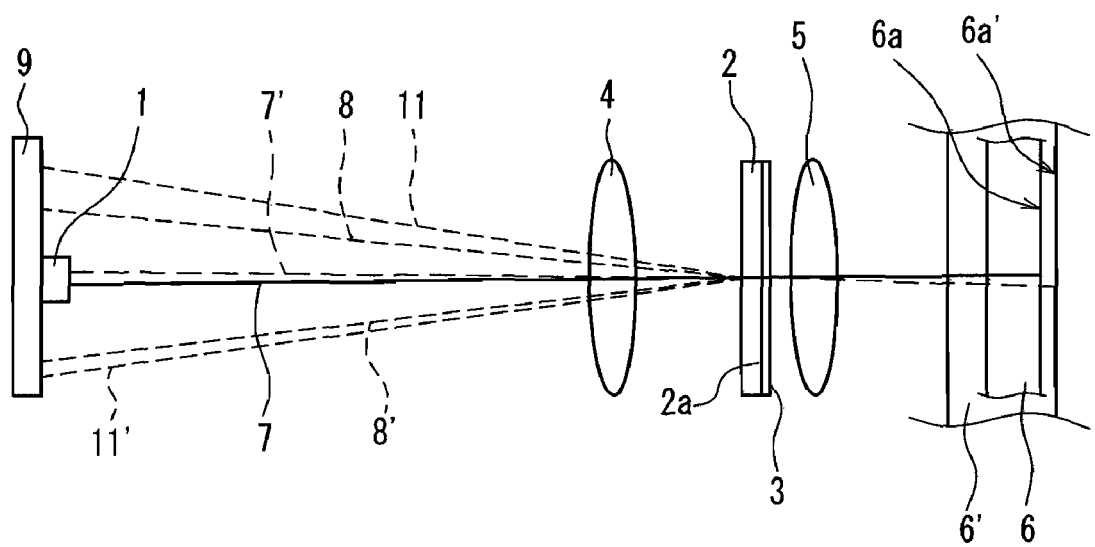
[FIG. 1]
Figure 1:
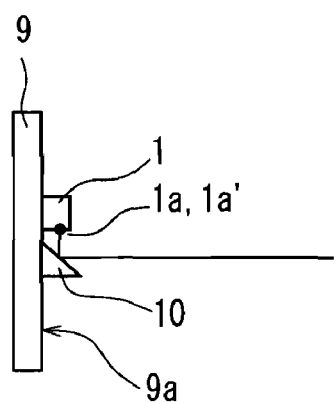
Figure 2:
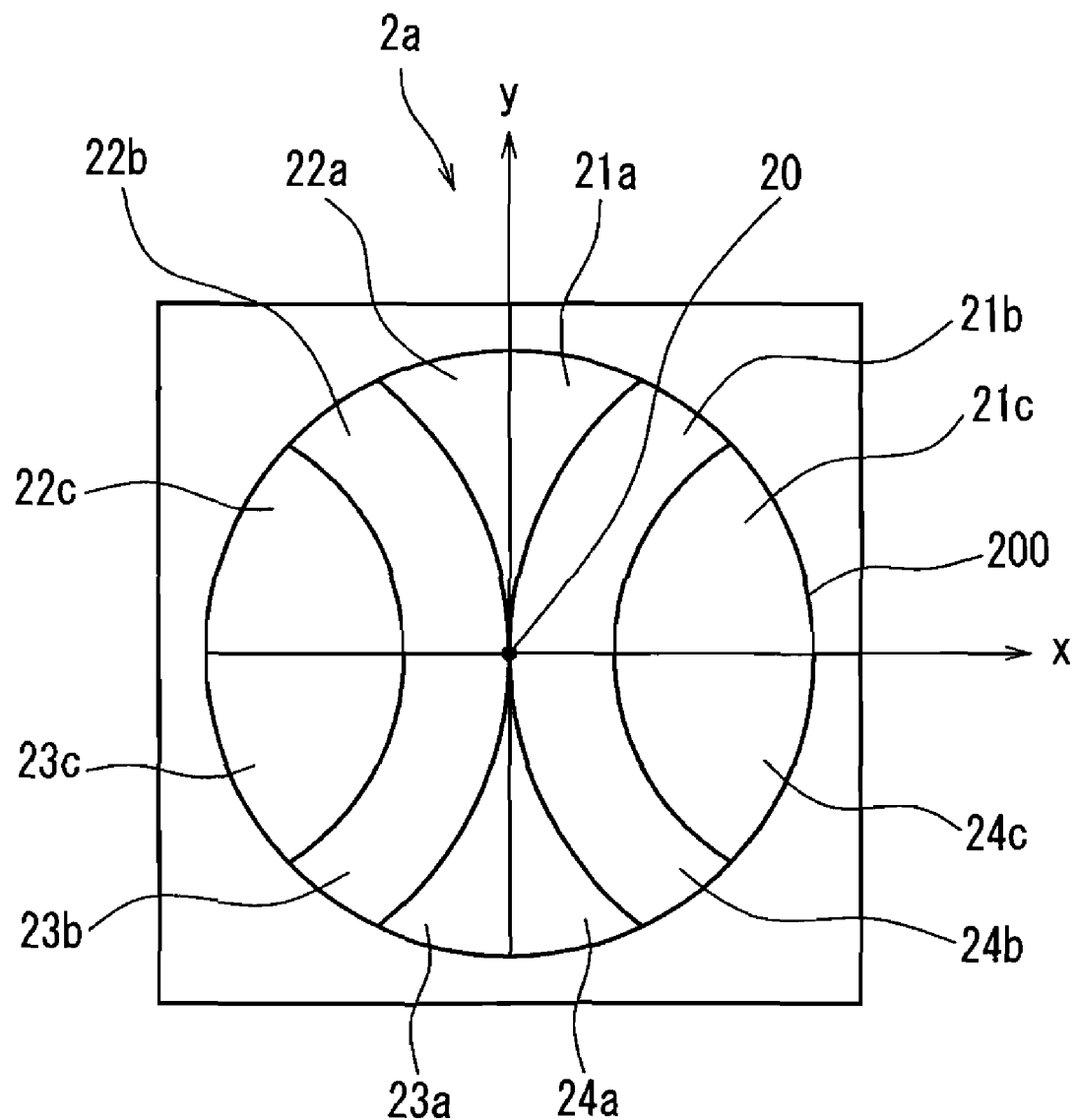
[FIG. 2]
Figure 3:
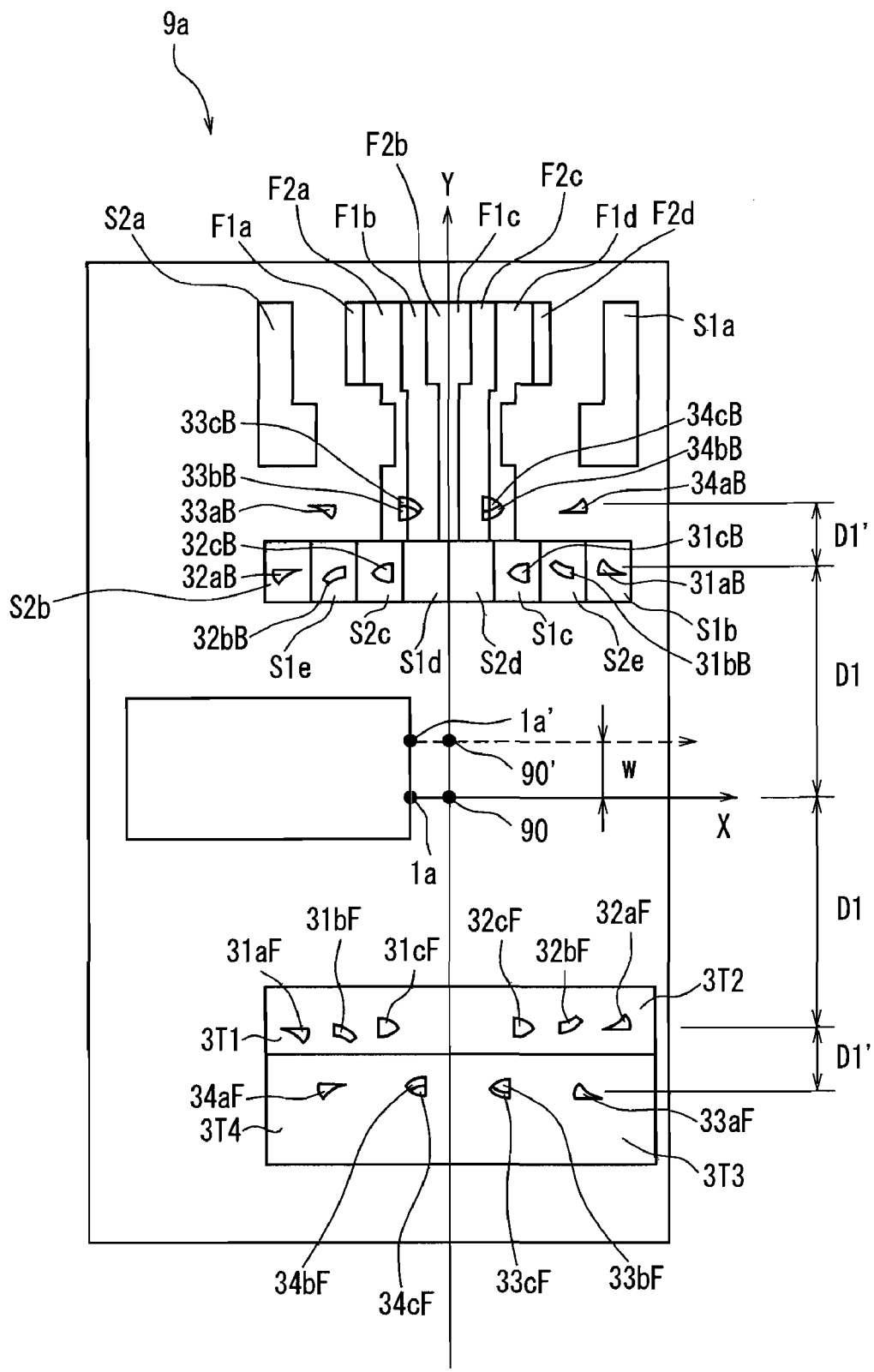
[FIG. 3]
Figure 4:
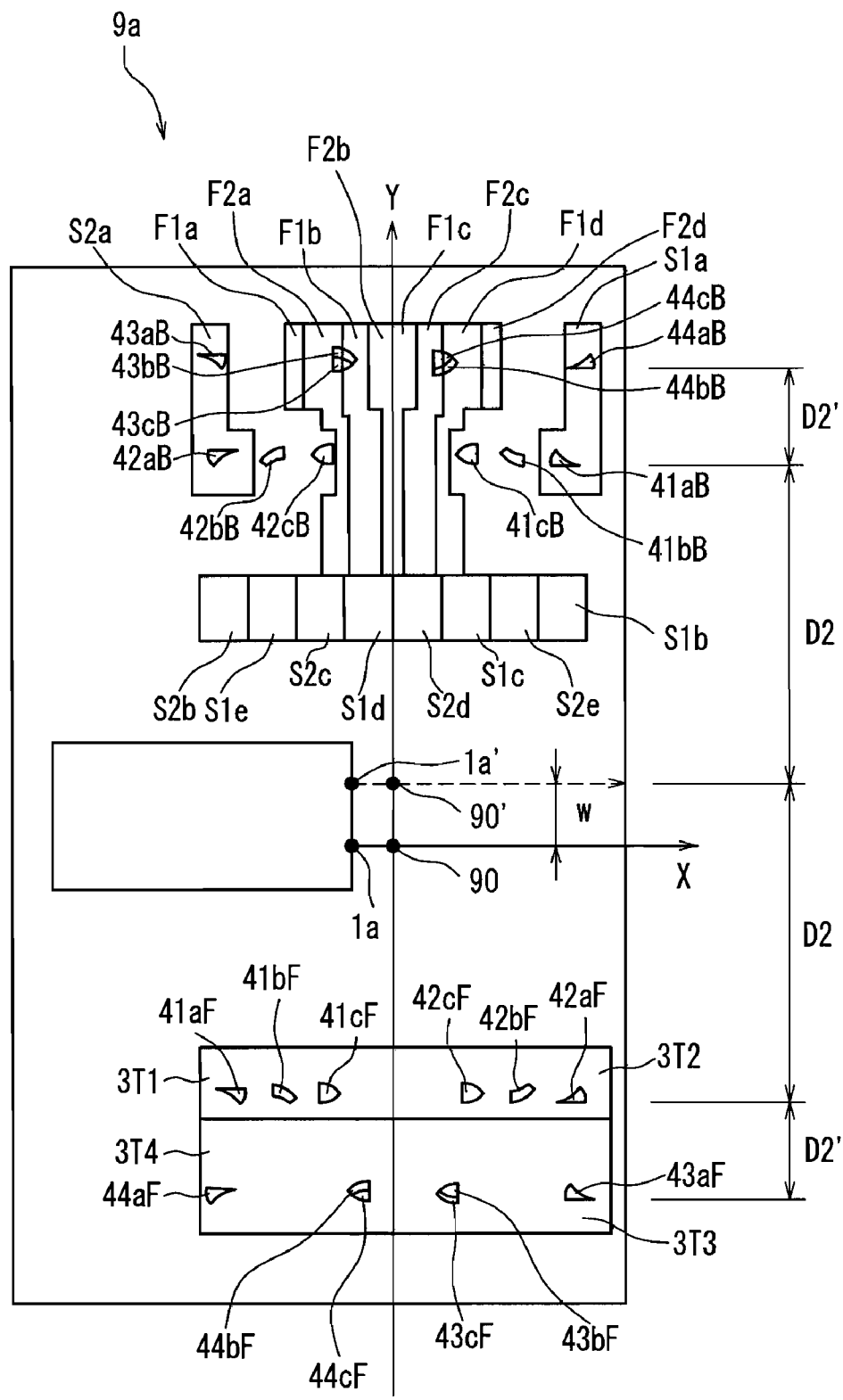
[FIG. 4]

FIG. 1(a) is a side view showing an optical disc device according to an embodiment of the present invention, and FIG. 1(b) is a plan view showing a light source part of the optical disc device. FIG. 2 is a diagram showing a hologram pattern formed on a hologram used in the optical disc device. FIG. 3 is a diagram showing a photodetective pattern formed on a photodetector used in the optical disc device, and a light distribution of returning light on the photodetector, with respect to a first laser beam emitted from a first emission point of the light source. FIG. 4 is a diagram showing a photodetective pattern formed on a photodetector used in the optical disc device, and a light distribution of returning light on the photodetector, with respect to a second laser beam emitted from a second emission point of the light source. FIGS. 2-4 show hologram planes and photodetective planes observed from the optical disc side. The components common to those of the conventional technique are indicated with the same reference numerals as those used for describing the conventional technique.

As shown in FIGS. 1(a) and 1(b), an optical disc device according to the present embodiment includes: a light source 1 such as a semiconductor laser; a collimator lens 4 for converting light emitted from the light source 1 into parallel light; a quarter-wavelength plate 3 for converting linearly-polarized light into circularly-polarized light (or elliptically-polarized light), and converting circularly-polarized light (or elliptically-polarized light) into linearly-polarized light; an objective lens 5 for focusing the parallel light on a track on a signal plane of an optical disc; a hologram for diffracting light (i.e., a returning light beam) reflected by an optical disc (a first optical disc 6, a second optical disc 6'); and a photodetector on which the returning light that has been diffracted by the hologram is focused in a diffused state.

The light source 1 is attached onto a photodetective substrate 9 and has a first emission point 1a for emitting a first laser beam of a wavelength $\lambda_1$ and a second emission point 1a' for emitting a second laser beam of a wavelength $\lambda_2$ ($\lambda_2 > \lambda_1$). On the photodetective substrate 9, a reflecting mirror 10 is attached in the vicinity of the light source 1 so as to reflect laser beams emitted from the emission points 1a, 1a' of the light source 1, thereby bending the optical paths.

The hologram includes a polarization hologram substrate 2 and a hologram plane 2a as an optical splitter formed on the polarization hologram substrate 2. The quarter-wavelength plate 3 is provided on the hologram plane 2a of the polarization hologram substrate 2, and configured to move integrally with the objective lens 5. As shown in FIG. 2, the hologram plane 2a is divided into four regions of a first quadrant, a second quadrant, a third quadrant and a fourth quadrant by two straight lines (x-axis, y-axis) crossing at right angles at an intersection 20 between an optical axis 7 for the first laser beam and the hologram plane 2a. The respective quadrants are divided further into regions 21a, 21b, 21c; 22a, 22b, 22c; 23a, 23b, 23c; and 24a, 24b, 24c (hologram pattern).

Here, the regions 21a, 22a, 23a and 24a denote regions for only a zeroth-order diffracted light that is reflected but not diffracted due to the track shape on the signal plane 6a of the first optical disc 6. The regions 21b, 22b, 23b and 24b denote regions outside the above regions that do not include a zeroth-order diffracted light from the first optical disc 6 and where a first-order diffracted light reflected and diffracted due to the track shape on the signal plane 6a' of the second optical disc 6' and a zeroth-order diffracted light overlap with each other. And the regions 21c, 22c, 23c and 24c denote regions where the zeroth-order diffracted light and the first-order diffracted light from the first optical disc 6 overlap with each other.

The photodetector includes a photodetective substrate 9 and a photodetective plane 9a formed on the photodetective substrate 9. The photodetective plane 9a is located approximately at a position of a focal plane of the collimator lens 4 (i.e., the position of a virtual emission point of the first emission point 1a shown in FIG. 1(b)). As shown in FIGS. 3 and 4, on the photodetective plane 9a, focus detection cells F1a, F2a, F1b, F2b, F1c, F2c, F1d and F2d are arranged along the Y-axis on the plus side of the Y-axis, trapezoidal off-track correction-detection cells S1b, S1c, S1d, S1e, S2b, S2c, S2d and S2e are arranged adjacent to the intersection 90 side of the focus detection cells, and furthermore, off-track correction-detection cells S1a and S2a are arranged sandwiching the focus detection cells (photodetective pattern), where the X-axis and Y-axis denote two straight lines crossing orthogonally at the intersection 90 between the optical axis 7 and the photodetective plane 9a, and parallel to the x-axis and y-axis respectively. On the minus side of the Y-axis, trapezoidal tracking detection cells 3T1, 3T2, 3T3 and 3T4 are arranged (photodetective pattern). These detection cells are arranged symmetrically with respect to the Y-axis. A light beam emitted from the first emission point 1a of the light source 1 travels in parallel to the X-axis in a plane that includes the X-axis and that is perpendicular to the sheet of drawing, and is reflected by the reflecting mirror 10 in the direction of the optical axis 7 (a direction passing through the intersection 90 and orthogonal to the sheet of drawing).

As shown in FIGS. 1(a) and 1(b), the first laser beam (wavelength: $\lambda_1$) emitted from the first emission point 1a of the light source 1 is reflected by the reflecting mirror 10, and focused by the collimator lens 4 so as to form parallel light. This parallel light as linearly-polarized light (S-wave or P-wave) passes through the hologram and is converted into circularly-polarized light by the quarter-wavelength plate 3, then focused by the objective lens 5 so as to form a light spot on the signal plane 6a of the first optical disc 6. The light reflected by the signal plane 6a of the first optical disc 6 passes through the objective lens 5 and is converted into linearly-polarized light (P-wave or S-wave) by the quarter-wavelength plate 3, and then enters the hologram plane 2a.

The linearly-polarized light entering the hologram plane 2a is diffracted by the hologram plane 2a, and split into a first-order diffracted light 8 and a minus first-order diffracted light 8' that are symmetrical to each other with respect to the optical axis 7 serving as a symmetry axis. The diffracted light beams respectively pass through the collimator lens 4 so as to form convergent light beams, then enter the photodetective plane 9a on the photodetective substrate 9. The diffraction efficiency provided by the hologram plane 2a for the returning light is, for example, about 0% in the case of zeroth-order light and about 41% in the case of the respective ±first-order light beams.

The second laser beam (wavelength: $\lambda_2$, where $\lambda_2 > \lambda_1$) emitted from the second emission point 1a' of the light source 1 is reflected by the reflecting mirror 10, and focused by the collimator lens 4 so as to form parallel light. This parallel light as linearly-polarized light (S-wave or P-wave) passes through (is diffracted partly by) the hologram and is converted into elliptically-polarized light by the quarter-wavelength plate 3, then focused by the objective lens 5 so as to form a light spot on the signal plane 6a' of the second optical disc 6'. The light reflected by the signal plane 6a' of the second optical disc 6' passes through the objective lens 5 and is converted into linearly-polarized light (P-wave or S-wave) by the quarter-wavelength plate 3, then enters the hologram plane 2a. The linearly-polarized light entering the hologram plane 2a is diffracted by the hologram plane 2a, and split into a first-order diffracted light 11 and a minus first-order diffracted light 11' that are symmetrical to each other with respect to the optical axis 7' serving as a symmetry axis. The diffracted light beams respectively pass through the collimator lens 4 so as to form convergent light beams, then enter a photodetective plane 9a of the photodetective substrate 9.

As shown in FIG. 3, among the light beams that have been reflected by the signal plane 6a of the first optical disc 6 corresponding to the first laser beam and that have entered the hologram plane 2a, first-order diffracted light beams 21a', 21b' and 21c' (not shown) diffracted by the regions 21a, 21b and 21c on the first quadrant of the hologram plane 2a are focused respectively as light spots 31aB, 31bB and 31cB on the detection cells S1b, S2e and S1c; minus first-order diffracted light beams 21a", 21b" and 21c" (not shown) diffracted by the regions 21a, 21b and 21c on the first quadrant of the hologram plane 2a are focused respectively as light spots 31aF, 31bF and 31cF on the detection cell 3T1. First-order diffracted light beams 22a', 22b' and 22c' (not shown) diffracted by the regions 22a, 22b and 22c on the second quadrant of the hologram plane 2a are focused respectively as light spots 32aB, 32bB and 32cB on the detection cells S2b, S1e and S2c; minus first-order diffracted light beams 22a", 22b" and 22c" (not shown) diffracted by the regions 22a, 22b and 22c on the second quadrant of the hologram plane 2a are focused respectively as light spots 32aF, 32bF and 32cF on the detection cell 3T2. First-order diffracted light 23a' (not shown) diffracted by the region 23a on the third quadrant of the hologram plane 2a forms a light spot 33aB at a position not belonging to any of the detection cell surfaces. First-order diffracted light beams 23b' and 23c' (not shown) diffracted by the regions 23b and 23c on the third quadrant of the hologram plane 2a are focused as light spots 33cB and 33bB astride the border between the detection cells F2a and F1b in an adjacent state similar to the adjacent state of the regions 23b and 23c; minus first-order diffracted light beams 23a", 23b" and 23c" (not shown) diffracted by the regions 23a, 23b and 23c on the third quadrant of the hologram plane 2a are focused respectively as light spots 33aF, 33bF and 33cF on the detection cell 3T3. The light spots 33bF and 33cF are focused in an adjacent state similar to the adjacent state of the regions 23c and 23b.

Further, a first-order diffracted light 24' (not shown) diffracted by the region 24a on the fourth quadrant of the hologram plane 2a forms a light spot 34aB at a position not belonging to any of the detection cell surfaces. First-order diffracted light beams 24b' and 24c' (not shown) diffracted by the regions 24b and 24c on the fourth quadrant of the hologram plane 2a are focused as light spots 34bB and 34cB astride the border between the detection cells F2c and F1d in an adjacent state similar to the adjacent state of the regions 24b and 24c; minus first-order diffracted light beams 24a", 24b" and 24c" (not shown) diffracted by the regions 24a, 24b and 24c on the fourth quadrant of the hologram plane 2a are focused respectively as light spots 34aF, 34bF and 34cF on the detection cell 3T4. The light spots 34bF and 34cF are focused in an adjacent state similar to the adjacent state of the regions 24b and 24c.

As shown in FIG. 4, among the light beams that have been reflected by the signal plane 6a' of the second optical disc 6' corresponding to the second laser beam and that have entered the hologram plane 2a, a first-order diffracted light 41a' (not shown) diffracted by the region 21a on the first quadrant of the hologram plane 2a is focused as a light spot 41aB on the detection cell S1a; first-order diffracted light beams 41b' and 41c' (not shown) diffracted by the regions 21b and 21c on the first quadrant of the hologram plane 2a form light spots 41bB and 41cB at positions not belonging to any of the detection cell surfaces. Minus first-order diffracted light beams 41a", 41b" and 41c" (not shown) diffracted by the regions 21a, 21b and 21c on the first quadrant of the hologram plane 2a are focused respectively as light spots 41aF, 41bF and 41cF on the detection cell 3T1. First-order diffracted light 42a' (not shown) diffracted by the region 22a on the second quadrant of the hologram plane 2a is focused as a light spot 42aB on the detection cell S2a; first-order diffracted light beams 42b' and 42c' (not shown) diffracted by the regions 22b and 22c on the second quadrant of the hologram plane 2a form light spots 42bB and 42cB at positions not belonging to any of the detection cell surfaces. Minus first-order diffracted light beams 42a", 42b" and 42c" (not shown) diffracted by the regions 22a, 22b and 22c on the second quadrant of the hologram plane 2a are focused respectively as light spots 42aF, 42bF and 42cF on the detection cell 3T2. First-order diffracted light 43a' (not shown) diffracted by the region 23a on the third quadrant of the hologram plane 2a is focused as a light spot 43aB on the detection cell S2a; the first-order diffracted light beams 43b' and 43c' (not shown) diffracted by the regions 23b and 23c on the third quadrant of the hologram plane 2a are focused as light spots 43bB and 43cB astride the border between the detection cells F2a and F1b in an adjacent state similar to the adjacent state of the regions 23b and 23c. Minus first-order diffracted light beams 43a", 43b" and 43c" (not shown) diffracted by the regions 23a, 23b and 23c on the third quadrant of the hologram plane 2a are focused as light spots 43aF, 43bF and 43cF respectively on the detection cell 3T3. Here, the light spots 43bF and 43cF are focused in an adjacent state similar to the adjacent state of the regions 23c and 23b. Further, a first-order diffracted light 44a' (not shown) diffracted by the region 24a on the fourth quadrant of the hologram plane 2a is focused as a light spot 44aB on the detection cell S1a; first-order diffracted light beams 44b' and 44c' (not shown) diffracted by the regions 24b and 24c on the fourth quadrant of the hologram plane 2a are focused as light spots 44bB and 44cB astride the border between the detection cells F2c and F1d in an adjacent state similar to the adjacent state of the regions 24b and 24c. Minus first-order diffracted light beams 44a", 44b" and 44c" (not shown) diffracted by the regions 24a, 24b and 24c on the fourth quadrant of the hologram plane 2a are focused as light spots 44aF, 44bF and 44cF respectively on the detection cell 3T4. Here, the light spots 44bF and 44cF are focused in an adjacent state similar to the adjacent state of the regions 24b and 24c.

Figure 5:
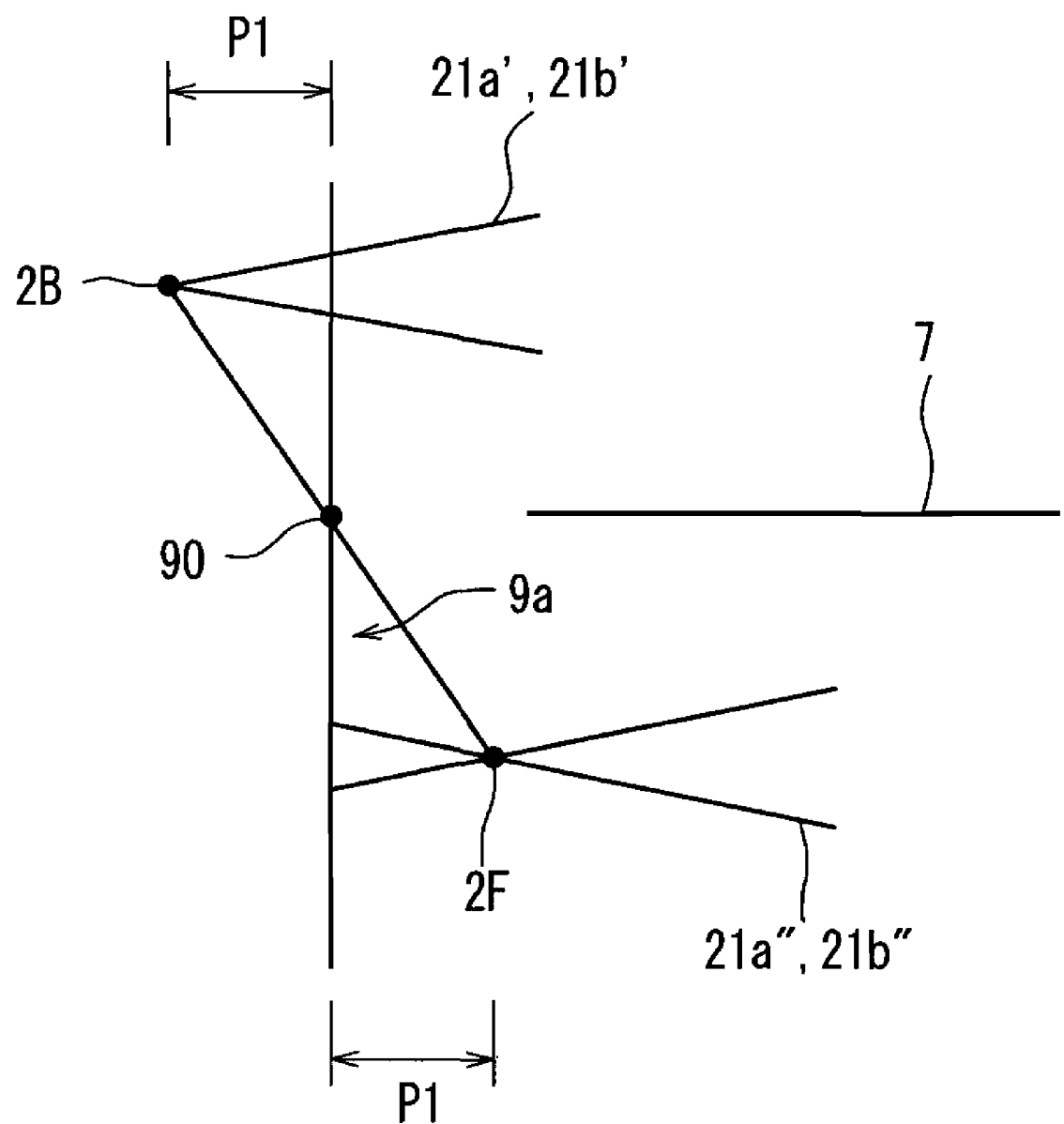
[FIG. 5]

FIG. 5 is a diagram for explaining the positions of focal point on the front and back sides of the photodetective plane 9a on the cross section along the optical axis 7, at the time of focusing with respect to the signal plane 6a of the first optical disc 6, for the case of the first-order diffracted light beams 21a', 21b' and the minus first-order diffracted light beams 21a", 21b". Here, zeroth-order diffraction components corresponding to the respective diffracted light beams are focused at the point 90 on the photodetective plane 9a. However, as the diffraction efficiency of a zeroth-order diffracted light is substantially zero, light is not irradiated actually.

As shown in FIG. 5, among the returning light 200 (see FIG. 2) returning from the first optical disc 6 so as to be diffracted by the hologram plane 2a, the first-order diffracted light beams 21a' and 21b' diffracted respectively by the regions 21a and 21b on the first quadrant of the hologram plane 2a are focused on a point 2B positioned on the back side of the photodetective plane 9a with a distance P1; the minus first-order diffracted light beams 21a" and 21b" diffracted respectively by the regions 21a and 21b on the first quadrant of the hologram plane 2a are focused on a point 2F positioned on the front side of the photodetective plane 9a with a distance P1 (the optical paths are indicated with solid lines). Since the same principle is applied to the first-order diffracted light beams 22a', 22b', 22c', 23a', 23b', 23c', 24a', 24b', 24c' and minus first-order diffracted light beams 22a", 22b", 22c", 23a", 23b", 23c", 24a", 24b", 24c" diffracted respectively by the regions 22a, 22b, 22c, 23a, 23b, 23c, 24a, 24b, and 24c on the second quadrant, the third quadrant and the fourth quadrant of the hologram plane 2a, further explanations therefor will be omitted.

Some of the detection cells are electrically connected, and as a result, the following eight signals can be obtained.

F1=(a signal obtained in the detection cell F1a)+(a signal obtained in the detection cell F1b)+(a signal obtained in the detection cell F1c)+(a signal obtained in the detection cell F1d)

F2=(a signal obtained in the detection cell F2a)+(a signal obtained in the detection cell F2b)+(a signal obtained in the detection cell F2c)+(a signal obtained in the detection cell F2d)

T1=(a signal obtained in the detection cell 3T1)

T2=(a signal obtained in the detection cell 3T2)

T3=(a signal obtained in the detection cell 3T3)

T4=(a signal obtained in the detection cell 3T4)

S1=(a signal obtained in the detection cell S1a)+(a signal obtained in the detection cell S1b)+(a signal obtained in the detection cell S1c)+(a signal obtained in the detection cell S1d)+(a signal obtained in the detection cell S1e)

S2=(a signal obtained in the detection cell S2a)+(a signal obtained in the detection cell S2b)+(a signal obtained in the detection cell S2c)+(a signal obtained in the detection cell S2d)+(a signal obtained in the detection cell S2e)

In FIGS. 3 and 4, with the Y-axis indicating the radial direction of the optical disc (the first optical disc 6, the second optical disc 6'), a focus error signal FE onto the signal plane of the optical disc, a signal TE1, a signal TE2, and a reproduction signal RF for the signal plane of the optical disc are calculated respectively on the basis of the following Formulae (7) to (10).

$$FE = F1 - F2 \quad \text{Formula (7)}$$

$$TE1 = S1 - S2 \quad \text{Formula (8)}$$

$$TE2 = (T2 + T3) - (T1 + T4) \quad \text{Formula (9)}$$

$$RF = T1 + T2 + T3 + T4 \quad \text{Formula (10)}$$

In the combination of the first laser beam and the first optical disc 6, the signal TE1 obtained through the expression of the above Formula (8) is determined as a tracking error signal. In the combination of the second laser beam and the second optical disc 6', the signal TE obtained through the expression of the Formula (11) below is determined as a tracking error signal where $\alpha$ is a constant.

$$TE = TE2 - \alpha \times TE1 \quad \text{Formula (11)}$$

Calculations of these signals are performed with a calculator (not shown) provided on the photodetective substrate 9.

In FIG. 3, central points (not shown) of the respective light spots 31aF, 31aB, 31bB, 31bF, 31cB, 31cF and the light spots 32aF, 32aB, 32bF, 32bB, 32cF, 32cB are at positions separated by a distance D1 from the point 90 in measurement in the Y-axis direction. Central points (not shown) of the respective light spots 33aF, 33aB, 33cF, 33cB and the light spots 34aF, 34aB, 34cF, 34cB are at positions separated by a distance D1+D1' from the point 90 in measurement in the Y-axis direction. In FIG. 4, central points (not shown) of the respective light spots 41aF, 41aB, 41bF, 41bB, 41cB, 41cF and the light spots 42aF, 42aB, 42bF, 42bB, 42cB, 42cF are at positions separated by a distance D2 from the point 90 in measurement in the Y-axis direction. Central points (not shown) of the respective light spots 43aF, 43aB, 43cF, 43bB and the light spots 44aB, 44aF, 44cF, 44cB are at positions separated by a distance D2+D2' from the point 90 in measurement in the Y-axis direction. The first emission point 1a and the second emission point 1a', namely, the point 90 and the point 90' are separated from each other by a distance w along the Y-axis, and the Formula (12) below is established.

$$D2 = D1 + w \quad \text{Formula (12)}$$

Here, the light spots are configured so that the following pairs of light spots agree substantially to each other: the light spot 31aF to the first laser beam and the light spot 41aF to the second laser beam; the light spot 31bF to the first laser beam and the light spot 41bF to the second laser beam; the light spot 31cF to the first laser beam and the light spot 41cF to the second laser beam; the light spot 32aF to the first laser beam and the light spot 42aF to the second laser beam; the light spot 32bF to the first laser beam and the light spot 42bF to the second laser beam; and, the light spot 32cF to the first laser beam and the light spot 42cF to the second laser beam. Furthermore, the distance from the point 90 and the point 90' as the virtual emission points of the laser beams is approximately proportional to the diffraction angle, and the diffraction angle is approximately proportional to the wavelength, thereby the following Formula (13) is established.

$$D2/D1 = D2'/D1' = \lambda_2/\lambda_1 \quad \text{Formula (13)}$$

For example, D1=540 μm and D2=650 μm when $\lambda_1$=660 nm, $\lambda_2$=795 nm and w=110 μm.

The photodetective pattern in the present embodiment has the above-described configuration. The light spot 33aF, 33bF, 33cF and the light spots 43aF, 43bF, 43cF are formed within the detection cell 3T3, and the light spot 34aF, 34bF, 34cF and the light spots 44aF, 44bF, 44cF are formed within the detection cell 3T4. The detection cells F1*a*, F1*b*, F1*c*, F1*d*, F2*a*, F2*b*, F2*c*, F2*d* are shaped to extend in the Y-axis direction, and the light spots 33*b*B and 33*c*B, 34*b*B and 34*c*B, and the light spots 43*b*B and 43*c*B, 44*b*B and 44*c*B extend less in the X-axis direction and substantially are arranged along the Y-axis, and thus they shift only in the Y-axis even when the wavelength varies. Therefore, the light spots 33*b*B and 33*c*B, the light spots 43*b*B and 43*c*B are arranged astride the border between the detection cells F2*a* and F1*b*. The light spots 34*b*B and 34*c*B, the light spots 44*b*B and 44*c*B are arranged astride the border between the detection cells F2*c* and F1*d*. As a result, from the above Formulae (7)-(11), desired focus error signals, tracking error signals and reproduction signals are obtained respectively with respect to the two laser beams.

Figure 11:
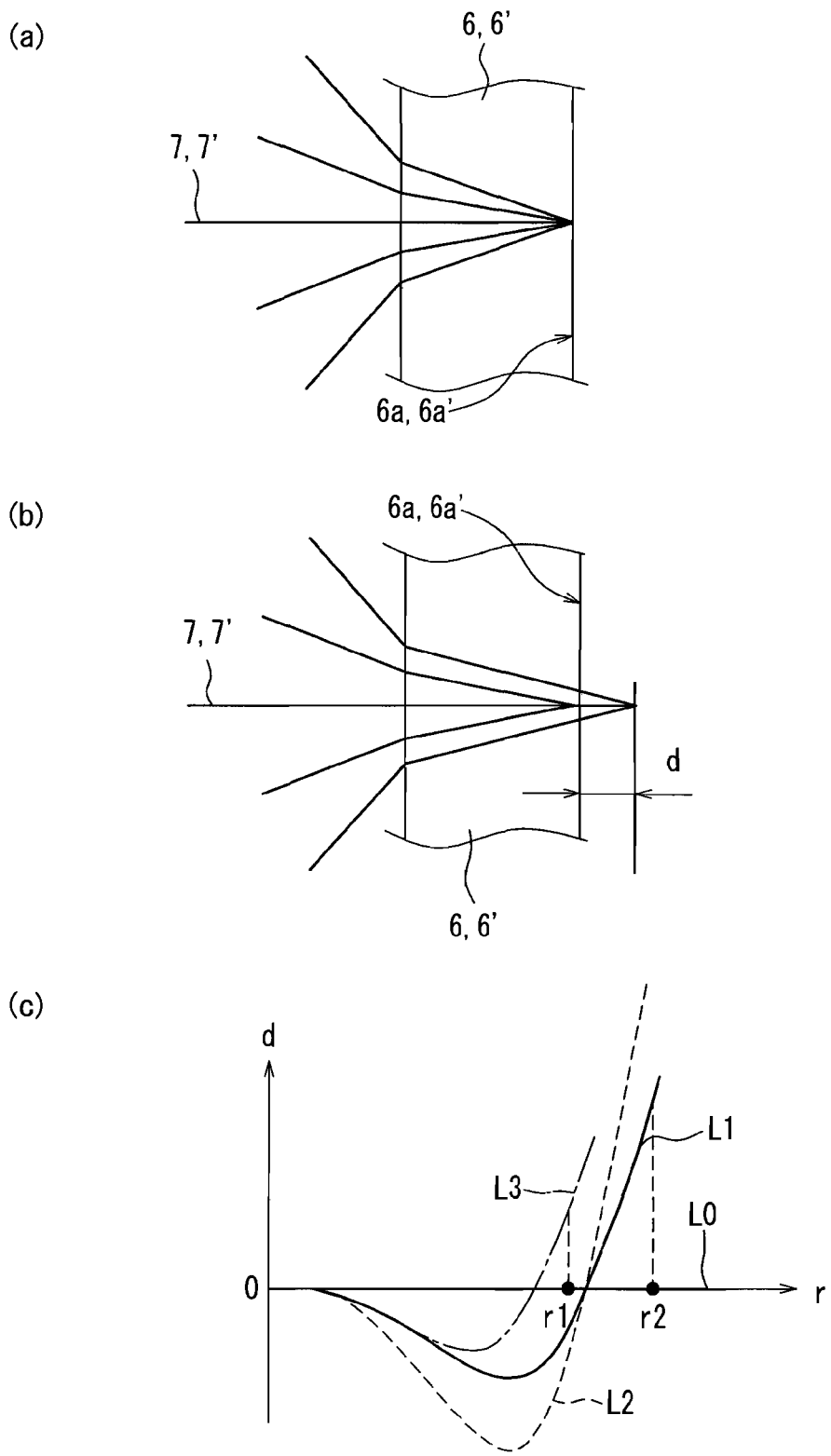
[FIG. 11]

Here, as mentioned above, when there is a positive error (thicker than the reference value) in the substrate thicknesses of the first optical disc 6 and the second optical disc 6', the convergence of light will be as shown in FIG. 11(*b*). At this time, the relationship between the incident height r of light entering the objective lens 5 and the longitudinal aberration d will form the curve L1 as shown in FIG. 11(*c*), and the wavefront aberration of the light reflected by the signal planes 6*a*, 6*a*' is doubled after passing through the objective lens 5, thereby forming a curve L2. Regarding the curve L2, the average distortion is substantially zero (the average value is on the straight line L0 in FIG. 11(*c*)) in a full-aperture region ($0 \leq r \leq r2$). When the incident height r1 is set to a value to meet r1<r2 and a focus control is performed with an aperture of $0 \leq r \leq r1$, the objective lens 5 is located closer to the signal planes 6*a* and 6*a*', and the wavefront aberration of reflected light after passing through the objective lens 5 forms substantially a curve L3. Regarding the curve L3, the average distortion is substantially zero (the average value is on the straight line L0 in FIG. 11(*c*)) in the aperture region of $0 \leq r \leq r1$. Therefore, since the average value of the wavefront of the reflected light after passing through the objective lens 5 becomes substantially flat, FE=0. Namely, the point to be focus-controlled at this time will be the near-side (the side where the objective lens is located closer to the signal plane of the optical disc).

Figure 12:
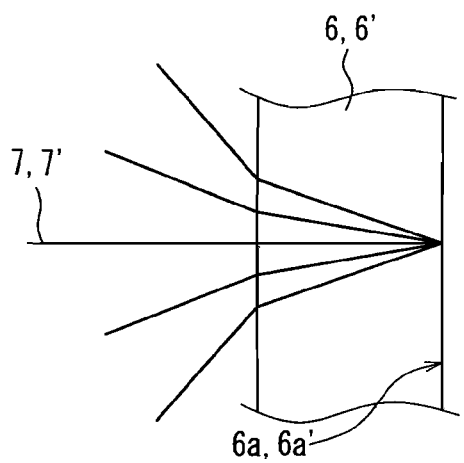
[FIG. 12] FIG. 12 (a) is a diagram showing convergence of light due to an objective lens in an optical disc device when there is no error in the substrate thicknesses of optical discs.
Figure 12:
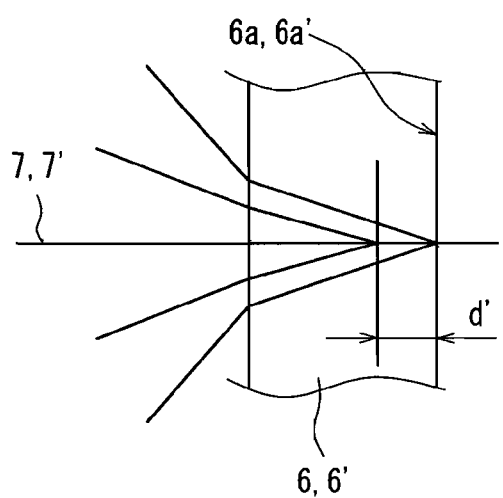
Figure 12:
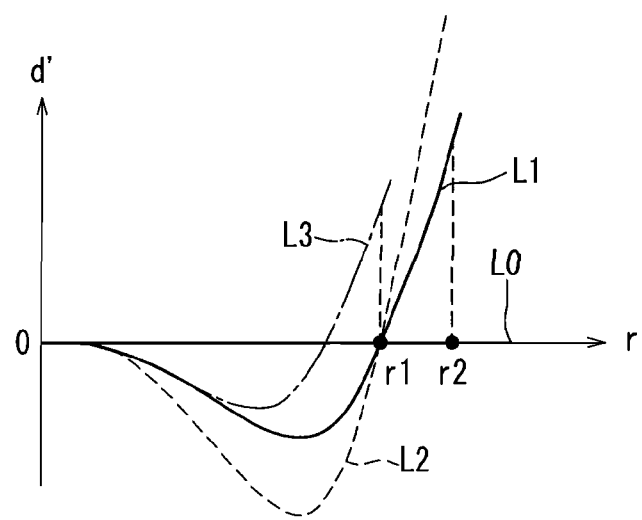

When there is a negative error (thinner than the reference value) in the substrate thicknesses of the first optical disc 6 and the second optical disc 6', the convergence of light will be as shown in FIG. 12(*b*). At this time, the relationship between the incident height r of light entering the objective lens 5 and the longitudinal aberration d' will form the curve L1 as shown in FIG. 12(*c*), and the wavefront aberration of the light reflected by the signal planes 6*a*, 6*a*' after passing through the objective lens 5 will form the doubled curve L2. Regarding the curve L2, the average distortion is substantially zero (the average value is on the straight line L0 in FIG. 12(*c*)) in a full-aperture region ($0 \leq r \leq r2$). When the incident height r1 is set to a value to meet r1<r2 and a focus control is performed with an aperture of $0 \leq r \leq r1$, the objective lens 5 is located away from the signal planes 6*a* and 6*a*', and the wavefront aberration of reflected light after passing through the objective lens 5 forms substantially a curve L3. Regarding the curve L3, the average distortion is substantially zero (the average value is on the straight line L0 in FIG. 12(*c*)) in the aperture region of $0 \leq r \leq r1$. Therefore, since the average value of the wavefront of the reflected light after passing through the objective lens 5 becomes substantially flat, FE=0. Namely, the point to be focus-controlled at this time will be the far-side (the side where the objective lens is located away from the signal plane of the optical disc).

Here, according to the above Formula (7), the focus error signal FE is generated from the diffracted light beams diffracted by the regions 23*b*, 23*c*, 24*b* and 24*c* on the hologram plane 2*a* as shown in FIG. 2. The diffracted light beams for generating the focus error signal FE do not include the diffracted light beams diffracted by the regions 23*a*, 24*a*. As shown in FIG. 2, a considerable part of the light entering the regions 23*b*, 23*c*, 24*b* and 24*c* has negative longitudinal aberration d in FIG. 11(*c*) because a large part of the light has smaller incident height r. Therefore, the wavefront aberrations formed by the diffracted light beams diffracted by the regions 23*b*, 23*c*, 24*b* and 24*c* will have properties expressed with a curve like the curve L3 in FIG. 11(*c*). As a result, the light generating the focus error signal FE of the present configuration will be equivalent to the light in an aperture region of $0 \leq r \leq r1$, and as mentioned above, the point where FE=0 shifts to a side (near-side) where the objective lens 5 is located closer to the signal plane 6*a* of the first optical disc 6 and the signal plane 6*a*' of the second optical disc 6'.

It has been known experimentally that when there is a positive error (thicker than a reference value) in the substrate thicknesses of the first optical disc 6 and the second optical disc 6' (a minus spherical aberration exists), a focus control position (jitter-best point) that minimizes the jitter during a signal reproduction shifts to the near-side. Therefore, since the direction that the position to be focus-controlled with FE=0 shifts agrees to the direction in which the jitter of the reproduction signal decreases, the jitter of the reproduction signal at the focus control point can be decreased. This example refers to a case where the focus error signal FE is generated from the diffracted light beams diffracted by the regions 23*b*, 23*c*, 24*b* and 24*c* on the basis of above Formula (7). A similar effect can be obtained even when the focus error signal is generated only from the diffracted light beams diffracted by the regions 23*c* and 24*c*.

Figure 6:
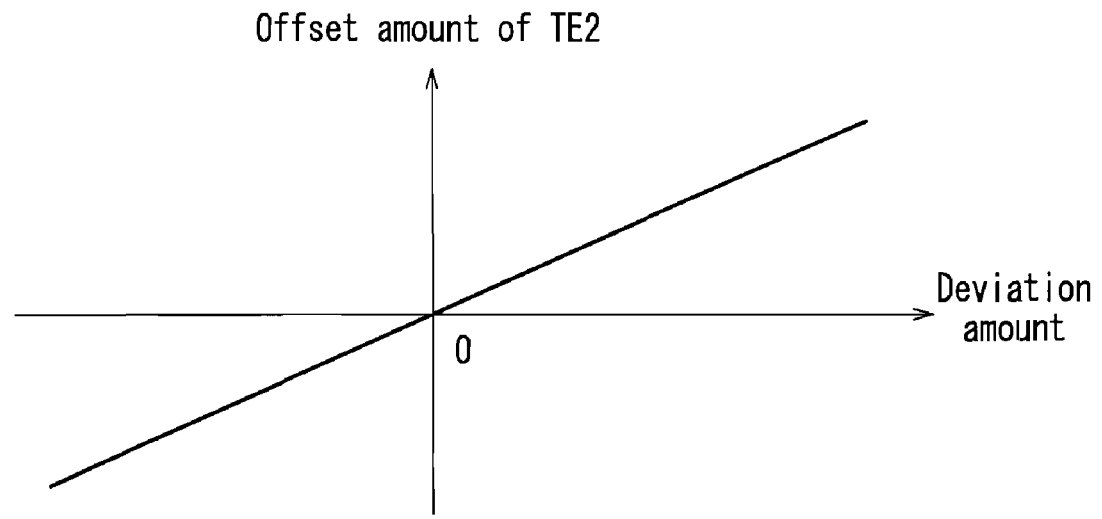
[FIG. 6] FIG. 6 includes diagrams showing behaviors of signals according to an embodiment of the present invention.
Figure 6:
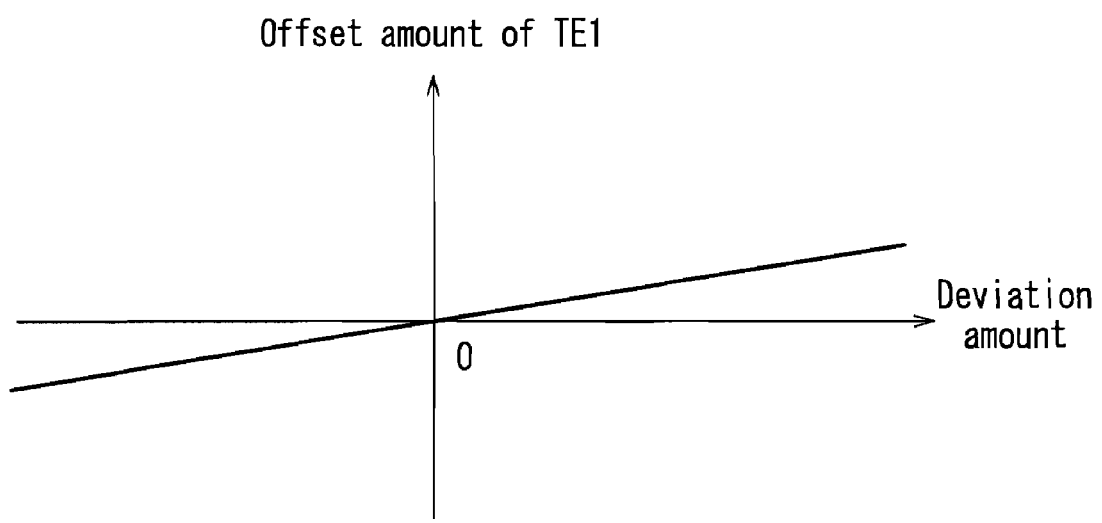
Figure 7:
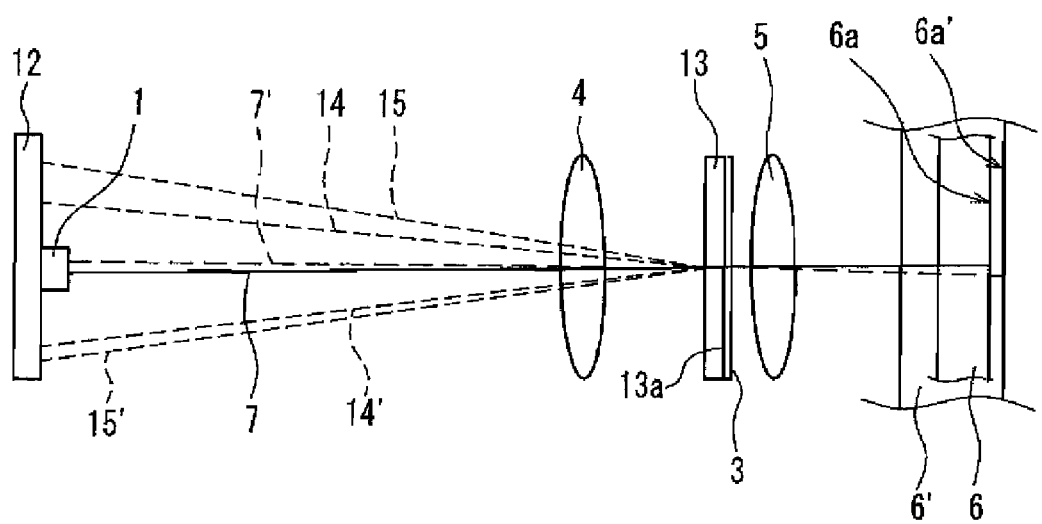
[FIG. 7]
Figure 7:
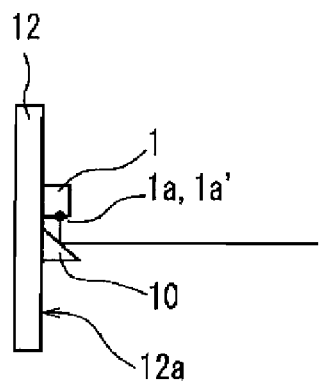
Figure 8:
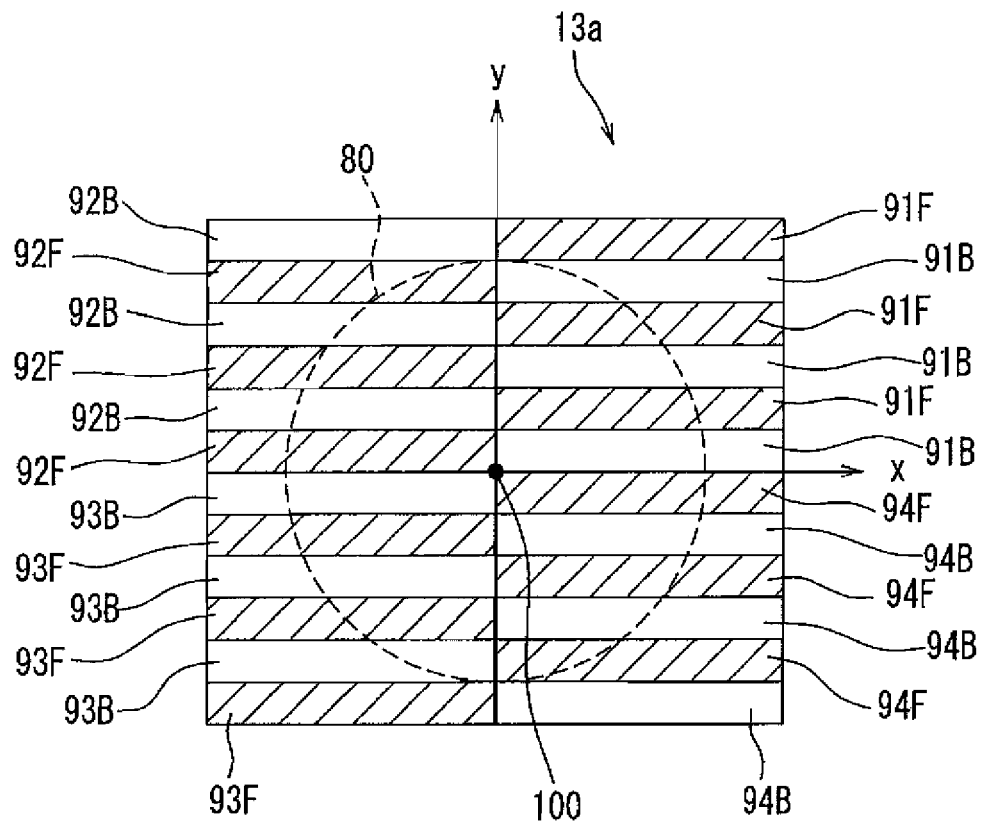
[FIG. 8]
Figure 9:
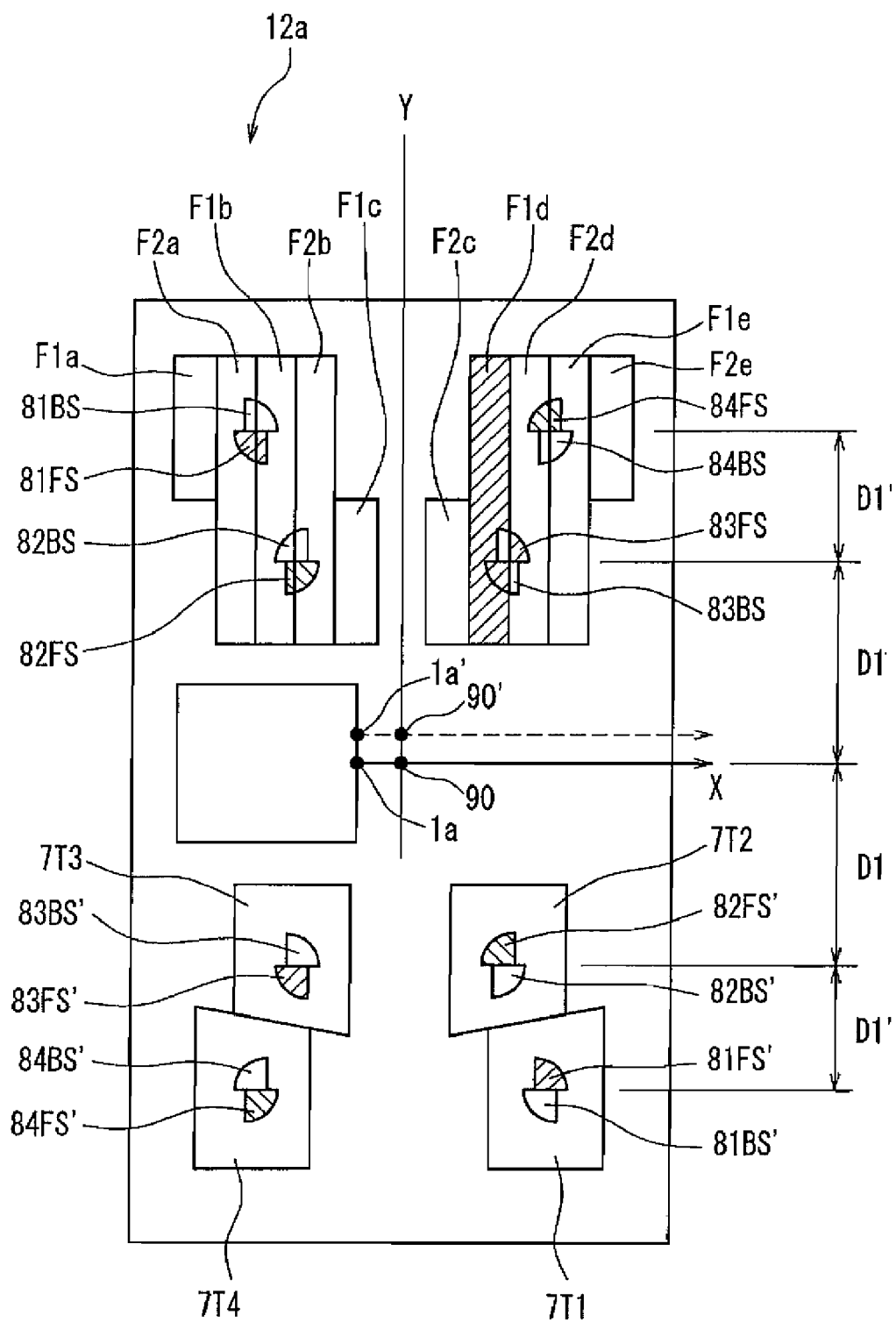
[FIG. 9]
Figure 10:
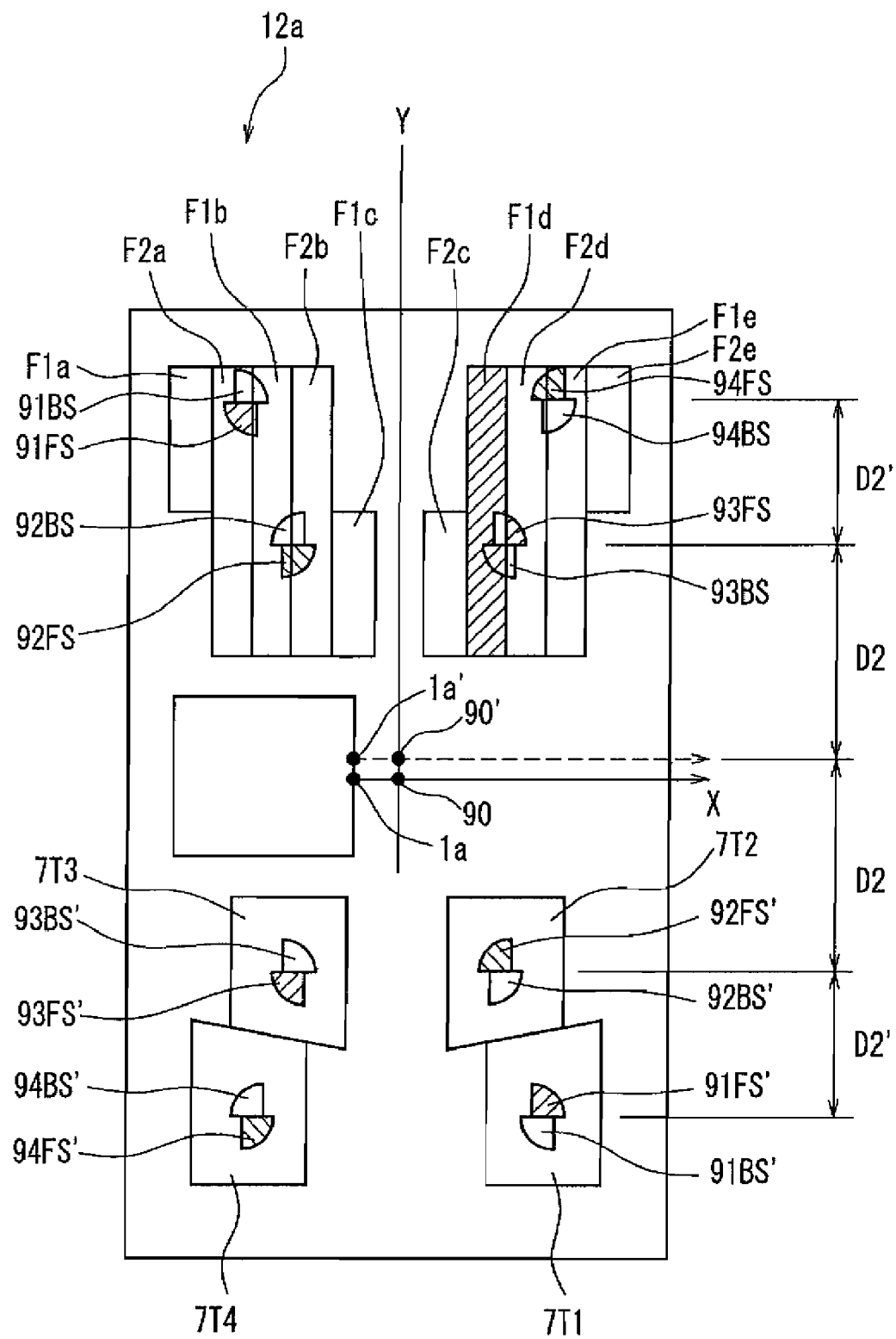
[FIG. 10]

FIG. 6 includes conceptual diagrams showing changes in the offset amount of the signal TE2 and signal TE1 when the objective lens 5 and the polarization hologram substrate 2 deviate along the disc radial direction of the second optical disc 6' with respect to the second laser beam. FIG. 6(*a*) shows a change in the offset amount of the signal TE2 obtained through the above Formula (9), and FIG. 6(*b*) shows a change in the offset amount of the signal TE1 obtained through the above Formula (8). In FIGS. 6(*a*) and 6(*b*), the horizontal axes indicate deviation of the objective lens 5 and the polarization hologram substrate 2 along the disc radial direction of the second optical disc 6', and the vertical axes indicate the offset amounts of the signals. In general, a light beam exhibits an uneven intensity distribution, i.e., the light is stronger near the optical axis and is weaker as the distance from the optical axis increases. As a result, offsets will be generated in the signal TE2 and the signal TE1 together with the deviation (deviation to the light intensity distribution) of the objective lens.

As clearly shown in FIG. 6, it is possible to cancel the offset of the tracking error signal TE caused by deviation of the objective lens 5 and the polarization hologram substrate 2, through the calculation based on the above Formula (11) where the signal TE1 is weighted suitably (constant: α) for the purpose of amplification and the thus calculated signal is subtracted from the signal TE2. As a result, no off-track will occur at the time of tracking control. The value of α will be about 20 for example, when the wavelength of the second laser beam ($\lambda_2$) is 790 nm, the numerical aperture (NA) of the objective lens 5 is 0.5, and the track pitch of the second optical disc 6' is 1.6 μm.

Similarly, regarding the first laser beam, when the objective lens 5 and the polarization hologram substrate 2 deviate along the disc radial direction of the first optical disc 6, the light distributions in the regions 21*a*, 21*b* and the light distributions in the regions 22a, 22b become asymmetrical (see FIG. 2). The cause of this phenomenon is as follows. A light beam emitted from the first emission point 1a exhibits an uneven intensity distribution, i.e., the light is stronger near the optical axis and is weaker as the distance from the optical axis increases. The above Formula (8) expresses a differential signal between the first quadrant and the second quadrant on the hologram plane 2a in a state where the regions 21b and 22b in FIG. 2 are exchanged with each other. The asymmetry in the light distributions in the regions of the first quadrant and the second quadrant is cancelled through the calculation of the above Formula (8), and thus the offset of the tracking error signal due to the deviation of the objective lens 5 and the polarization hologram substrate 2 will be decreased.

Therefore, according to the present embodiment, it is possible to be suitable for two types of optical discs, and even when there is an error in the substrate thicknesses of the optical discs, the distance between the focus control point and the point at which the jitter of the reproduction signal is minimized can be decreased to decrease the jitter of the reproduction signal at the focus control point. Moreover, even when there is a deviation along the disc radial direction of the objective lens 5 and the polarization hologram substrate 2, no off-tracks will occur during a tracking control. As a result, a stable tracking control is realized and the recording-reproducing performance of the optical disc device is improved.

Though the present embodiment refers to an example of an optical disc device configured to have a light source 1 for emitting two light beams having different wavelengths, even with a configuration to have a light source emitting one wavelength of light, effects substantially equal to those of the present embodiment can be obtained by employing a configuration of the present embodiment corresponding to the first laser beam and the second laser beam.

Further, though the present embodiment refers to an example of an optical disc device whose photodetective substrate 9 has a calculator to calculate the respective signals, effects substantially equal to those of the present embodiment can be obtained even with a configuration with a calculator provided outside the photodetective substrate 9.

Further, though the present embodiment refers to an example of an optical disc device configured by providing the light source 1 on the photodetective substrate 9, effects substantially equal to those of the present embodiment can be obtained even with a configuration where the light source 1 is provided irrespective of the photodetective substrate 9.

The following configuration is also available. Namely, in FIG. 3 for example,

S1'=(a signal obtained in the detection cell S1b)
S1"=(a signal obtained in the detection cell S1b)+(a signal obtained in the detection cell S2e)
S2'=a signal obtained in the detection cell S2b
S2"=(a signal obtained in the detection cell S2b)+(a signal obtained in the detection cell S1e);

calculations below are performed:

$$TE'=S1'-S2' \quad \text{Formula (14)}$$

$$TE''=S1''-S2'' \quad \text{Formula (15);}$$

with the constants β and γ, $$TE=TE2-\times TE1' \quad \text{Formula (16)}$$

or $$TE=TE2-\gamma \times TE'' \quad \text{Formula (17),}$$

with which the tracking error signal TE can be generated.

Similarly in this case, by selecting appropriately the values α and γ, it is possible to reduce the offset of the tracking error signal caused by the deviation of the objective lens 5 and the polarization hologram substrate 2, and thus effects substantially equal to the present embodiment can be obtained.

The following configuration is also available. For example, it is also possible that a diffracted light beam diffracted by the region 21c enters the detection cell 3T1, a diffracted light beam diffracted by the region 22c enters the detection cell 3T2, a diffracted light beam diffracted by the region 23c enters the detection cell 3T3, and a diffracted light beam diffracted by the region 24c enters the detection cell 3T4 respectively. Furthermore, it is also possible that diffracted light beams diffracted by the regions 21a, 21c enter the detection cell 3T1, diffracted light beams diffracted by the regions 22a, 22c enter the detection cell 3T2, diffracted light beams diffracted by the regions 23a, 23c enter the detection cell 3T3, and diffracted light beams diffracted by the regions 24a, 24c enter the detection cell 3T4 respectively. In these cases, effects substantially equal to those of the present embodiment can be obtained.

The following configuration is also available. Namely, in FIG. 2, for example, the regions 21b and 21c, the regions 22b and 22c, the regions 23b and 23c, and the regions 24b and 24c are not divided but integrated respectively with each other. In this case, similarly to the present embodiment, it is possible to obtain the effect of decreasing the distance between the focus control point and the point at which the jitter of the reproduction signal is minimized.

Furthermore, the following configuration is also available. Namely, for example, the above Formula (9) can be replaced by:

$$TE2=T2-T1 \quad \text{Formula (18)}$$

or $$TE2=T3-T4 \quad \text{Formula (19)}$$

as the expressions for obtaining the signal TE2. In this case, the optimum value α in the above Formula (11) will be a half the value in the case using the above Formula (9). In general, a noise and a circuit-offset exist in the circuit for calculating the signal TE1 in the Formula (11), and the noise and the circuit-offset are amplified α times in the Formula (11). Therefore, as the value of α is smaller, influences of the noise and the circuit-offset can be decreased, and thus the present configuration can realize a stable tracking control.

INDUSTRIAL APPLICABILITY

As described above, the present invention is useful in an optical pick-up device for an optical disc device that optically records information on an optical disc or optically reproduces information recorded on an optical disc, with use of a laser beam.

The invention claimed is:

1. An optical disc device, comprising: a light source, an objective lens, an optical splitter, and a photodetector;
    a light beam emitted from the light source passes through the objective lens so as to be focused on a track on a signal plane of an optical disc,
    the light beam reflected and diffracted by the track on the signal plane passes through the objective lens so as to enter the optical splitter, and
    the light beam emitted from the optical splitter is focused on the photodetector;
    wherein the optical splitter is divided into a region A' where a zeroth-order diffracted light from the optical disc enters alone and the remaining region A, the photodetector is divided into a detection region B' for detecting a light beam emitted from the region A' of the optical splitter and a detection region B for detecting a light beam emitted from the region A of the optical splitter;

a focus error signal is generated by a detection signal from the detection region B;

a tracking error signal is generated by a detection signal from the detection region B, or the detection regions B and B';

the tracking error signal is corrected by the detection signal from the detection region B'; and a focus control is performed based on the focus error signal so that when a substrate thickness of the optical disc has a positive error (thicker than a reference value), the objective lens is located closer to the signal plane of the optical disc; and when a substrate thickness of the optical disc has a negative error (thinner than a reference value), the objective lens is located away from the signal plane of the optical disc; wherein the optical splitter is divided into four quadrants k (k=1, 2, 3, 4 counterclockwise) by two straight lines (a y-axis parallel to the radial direction of the optical disc and an x-axis orthogonal to the y-axis) crossing an optical axis;

each of the quadrants k is divided further into a region Ak' where a zeroth-order diffracted light from the optical disc enters alone and the remaining region Ak;

light beams emitted from the regions Ak and Ak' of the optical splitter are detected respectively by detection cells Bk, Bk' on the detection regions B, B' and outputted as detection signals Ck, Ck': and a tracking error signal TE is generated through expressions (Formula 1) to (Formula 3) using α as a constant:

$$TE1=(C2'+C3')-(C1'+C4') \quad \text{(Formula 1)}$$

$$TE2=(C2+C3)-(C1+C4) \text{ or}$$

$$TE2=(C2+C2'+C3+C3')-(C1+C1'+C4+C4') \quad \text{(Formula 2)}$$

$$TE=TE2-\alpha\times TE1 \quad \text{(Formula 3)}.$$

2. An optical disc device comprising: a first light source, a second light sources, an objective lens, an optical splitter, and a photodetector;

light beams emitted from the first and second light sources pass through the objective lens so as to be focused respectively on tracks on signal planes of first and second optical discs, the light beams reflected and diffracted by the tracks on the signal planes pass through the objective lens so as to enter the optical splitter; and the light beam emitted from the optical splitter are focused on the photodetector;

wherein the optical splitter is divided into a region A' where a zeroth-order diffracted light from the first optical disc enters alone, a region A" outside a region where a zeroth-order diffracted light and a ±first-order diffracted light from the second optical disc overlap with each other, and the remaining region A;

the photodetector is divided into a detection region B' for detecting a light beam emitted from the region A' of the optical splitter, a detection region B" for detecting a light beam emitted from the region A" of the optical splitter, and a detection region B for detecting light emitted from the region A of the optical splitter;

a focus error signal for each optical disc is generated by a detection signal from the detection region B;

a tracking error signal is generated for each optical disc by a detection signal from the detection region B, detection regions B and B', or the detection regions B, B' and B";

the tracking error signal of the first optical disc is corrected by a detection signal from the detection region B';

the tracking error signal of the second optical disc is corrected by a detection signal from the detection region B", or the detection regions B' and B";

a focus control of the first optical disc is performed based on the focus error signal so that when the substrate thickness of the first optical disc has a positive error (thicker than a reference value), the objective lens is located closer to the signal plane of the first optical disc; and when the substrate thickness of the first optical disc has a negative error (thinner than a reference value), the objective lens is located away from the signal plane of the first optical disc; and a focus control of the second optical disc is performed based on the focus error signal so that when the substrate thickness of the second optical disc has a positive (thicker than a reference value) error, the objective lens is located closer to the signal plane of the second optical disc; and when the substrate thickness of the second optical disc has a negative (thinner than a reference value) error, the objective lens is located away from the signal plane of the second optical disc.

3. The optical disc device according to claim 2, wherein the optical splitter is divided into four quadrants k (k=1, 2, 3, 4 counterclockwise) by two straight lines (a y-axis parallel to the radial direction of the optical disc and an x-axis orthogonal to the y-axis) crossing an optical axis;

each of the quadrants k is divided further into a region Ak' where a zeroth-order diffracted light from the first optical disc enters alone, a region Ak" outside a region where a zeroth-order diffracted light and a ±first-order diffracted light from the second optical disc overlap with each other, and the remaining region Ak;

light beams emitted from the regions Ak, Ak' and Ak" of the optical splitter are detected respectively by detection cells Bk, Bk', Bk" on the detection regions B, B', B" and outputted as detection signals Ck, Ck', Ck"; and a tracking error signal TE with respect to the first optical disc is generated through expressions (Formula 4) to (Formula 6) using α as a constant:

$$TE1=(C2'+C3')-(C1'+C4') \quad \text{(Formula 4)}$$

$$TE2=(C2+C3)-(C1+C4) \text{ or}$$

$$TE2=(C2+C2'+C3+C3')-(C1+C1'+C3+C3') \text{ or}$$

$$TE2=(C2+C2'+C2''+C3+C3'+C3'')-(C1+C1'+C1''+C4+C4'+C4'') \quad \text{(Formula 5)}$$

$$TE=TE2-\alpha TE1 \quad \text{(Formula 6)}.$$

4. The optical disc device according to claim 2, wherein the optical splitter is divided into four quadrants k (k=1, 2, 3, 4 counterclockwise) by two straight lines (a y-axis parallel to the radial direction of the optical disc and an x-axis orthogonal to the y-axis) crossing an optical axis;

each of the quadrants k is divided further into a region Ak' where a zeroth-order diffracted light from the first optical disc enters alone, a region Ak" outside a region where a zeroth-order diffracted light and a ±first-order diffracted light from the second optical disc overlap with each other, and the remaining region Ak;

light beams emitted from the regions Ak, Ak' and Ak" of the optical splitter are detected respectively by detection cells Bk, Bk', Bk" on the detection regions B, B', B" and outputted as detection signals Ck, Ck', Ck"; and a tracking error signal TE with respect to the second optical disc is generated through expressions (Formula 7) to (Formula 9) using α as a constant:

$$TE1=(C2'+C3')-(C1'+C4') \text{ or}$$

$$TE1=(C2'+C2''+C3'+C3'')-(C1'+C1''+C4'+C4'') \quad \text{(Formula 7)}$$

$$TE2=(C2+C3)-(C1+C4) \text{ or}$$

$$TE2=(C2+C2'+C3+C3')-(C1+C1'+C4+C4') \text{ or}$$

$$TE2=(C2+C2'+C2''+C3+C3'+C3'')-(C1+C1'+C1''+C4+C4'+C4'') \quad \text{(Formula 8)}$$

$$TE=TE2-\alpha \times TE1 \quad \text{(Formula 9)}.$$

5. The optical disc device according to claim 2, wherein the first light source, the second light source and the photodetector are mounted on the same substrate.

* * * * *